(12) United States Patent
Cutler et al.

(10) Patent No.: US 11,715,361 B2
(45) Date of Patent: Aug. 1, 2023

(54) SYSTEMS AND METHODS FOR POTENTIAL DROWNING INCIDENT DETECTION

(71) Applicant: WAVE Systems, Inc., Westport, CT (US)

(72) Inventors: David M. Cutler, Westport, CT (US); Mark F. Caron, Glen Rock, NJ (US)

(73) Assignee: WAVE Systems, Inc., Westport, CT (US)

( * ) Notice: Subject to any disclaimer, the term of this patent is extended or adjusted under 35 U.S.C. 154(b) by 96 days.

(21) Appl. No.: 16/577,939

(22) Filed: Sep. 20, 2019

(65) Prior Publication Data
US 2020/0020221 A1    Jan. 16, 2020

Related U.S. Application Data

(63) Continuation-in-part of application No. 15/951,917, filed on Apr. 12, 2018, now abandoned.

(60) Provisional application No. 62/484,661, filed on Apr. 12, 2017.

(51) Int. Cl.
*G08B 21/08*     (2006.01)
*H04W 24/08*     (2009.01)
(Continued)

(52) U.S. Cl.
CPC .............. *G08B 21/088* (2013.01); *G06F 3/14* (2013.01); *H04B 1/0343* (2013.01);
(Continued)

(58) Field of Classification Search
CPC ......... G08B 21/088; G08B 19/00; G06F 3/14; H04B 1/0343; H04B 1/385;
(Continued)

(56) References Cited

U.S. PATENT DOCUMENTS 9,715,808 B2 *  7/2017  Snyder .................. G08B 21/08
2006/0001827 A1 * 1/2006  Howell .................. G02C 11/06
                                                           351/41
(Continued)

FOREIGN PATENT DOCUMENTS

JP          S62252219 A    * 11/1987

OTHER PUBLICATIONS

FCC, 15.247, FCC, pp. 859-862 (Year: 2013).*
Final Office Action from U.S. Appl. No. 15/951,917, dated Oct. 11, 2019, 28 pgs.

*Primary Examiner* — Brian Wilson
(74) *Attorney, Agent, or Firm* — Kintner IP, LLC; Mary Frances Ludwig

(57) ABSTRACT

A potential drowning incident detection system and its constituent components are disclosed. The system includes a device worn on a head of a swimmer, which includes one or more signal generating units. The signal generating units may be positioned on the device adjacent each temple of the swimmer when worn. The system further includes at least one hub configured to receive wireless signals from the signal generating units, and may further be in communication with a server. The hub and/or server may generate an alert or warning when the signals of the signal generating units are not received by the at least one sensor hub. The alert or warning may further be triggered to a wearable device provided to a responder, such as a life guard. Data collected from the swimmer-worn devices may be stored for later analysis.

14 Claims, 12 Drawing Sheets

(51) Int. Cl.
*H04B 1/034* (2006.01)
*G06F 3/14* (2006.01)
G06N 20/00 (2019.01)
H04W 84/04 (2009.01)
H04L 67/10 (2022.01)
G08B 19/00 (2006.01)

(52) U.S. Cl.
CPC ............. *H04W 24/08* (2013.01); *G06N 20/00* (2019.01); *G08B 19/00* (2013.01); *H04L 67/10* (2013.01); *H04W 84/042* (2013.01)

(58) Field of Classification Search
CPC .......... H04B 2001/3866; H04W 24/08; H04W 84/042; H04W 4/025; H04W 4/38; H04W 4/70; G06N 20/00; H04L 67/10; H04L 67/12
See application file for complete search history.

(56) References Cited

U.S. PATENT DOCUMENTS

| | | | |
|---|---|---|---|
| 2007/0046887 A1* | 3/2007 | Howell | G02C 11/10 351/41 |
| 2007/0109491 A1 | 5/2007 | Howell et al. | |
| 2008/0055537 A1 | 3/2008 | Asrani et al. | |
| 2008/0109949 A1* | 5/2008 | Kinsella | A63B 33/004 2/426 |
| 2008/0266118 A1 | 10/2008 | Pierson et al. | |
| 2010/0026501 A1 | 2/2010 | Cutler et al. | |
| 2012/0161958 A1* | 6/2012 | Turon | G01S 19/34 340/539.3 |
| 2015/0042476 A1* | 2/2015 | Holm | G08B 21/088 340/573.4 |
| 2015/0194031 A1 | 7/2015 | Cutler et al. | |
| 2017/0270323 A1* | 9/2017 | Butler | G06K 19/07749 |
| 2018/0040223 A1* | 2/2018 | Bodi | G08B 21/18 |

* cited by examiner

SYSTEMS AND METHODS FOR POTENTIAL DROWNING INCIDENT DETECTION

CROSS-REFERENCE TO RELATED APPLICATION

This application is a Continuation-in-part of U.S. patent application Ser. No. 15/951,917, entitled "Systems and Methods for Potential Drowning Incident Detection" and filed on Apr. 12, 2018, which in turn claims priority to U.S. Provisional Application No. 62/484,661, entitled "Systems and Devices for Potential Drowning Incident Detection," and filed on Apr. 12, 2017. By this reference, the contents of both applications are incorporated herein in their entirety.

TECHNICAL FIELD

The present disclosure relates to wireless devices connected to a system that monitors swimmers in and around a designated swimming area for a potential drowning incident and issues an alert or warning.

BACKGROUND

Despite diligent and caring supervision by lifeguards, family and friends, drowning incidents causing fatalities or neurological damage continue to occur with an alarming rate at residential, municipal and commercial swimming pools, ponds and lakes. Drowning incidents are often extremely difficult to detect even for trained individuals, often taking only seconds, and silently striking swimmers regardless of ability and age. The tragic results often devastate the lives of the victims, their families, supervising staff, and whole communities.

Drowning detection systems are not intended to replace supervision of swimmers by lifeguards or guardians, nor are they intended to diminish the importance of safety protocols like the "buddy system." Instead, they are intended to augment these long-established practices with technology that supplements the guardian's senses, by detecting drowning incidents as they occur, and reporting them in a quick and timely manner to those same guardians, so that they might react more quickly to positively affect outcomes.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure.

DETAILED DESCRIPTION

Figure 1:
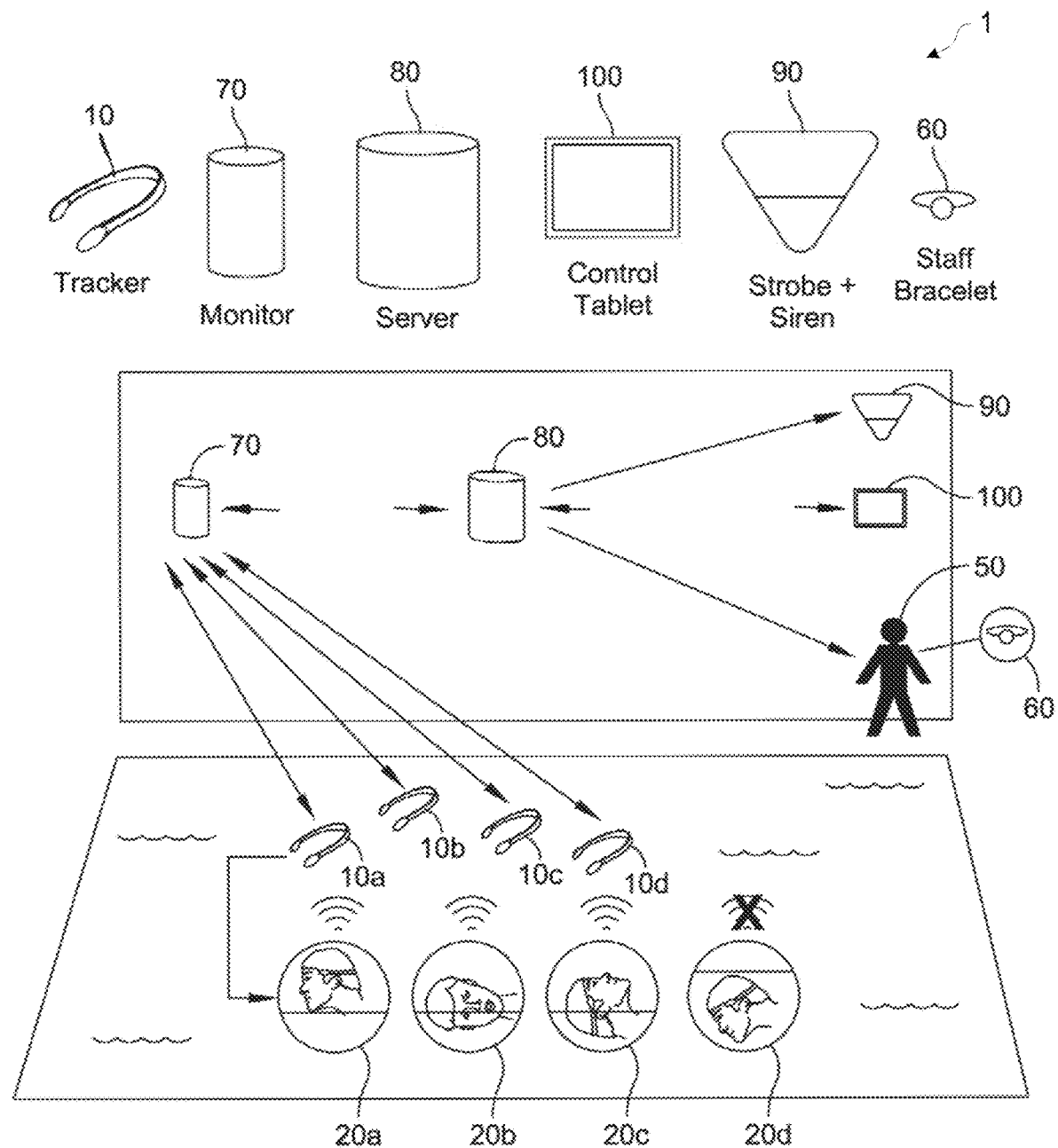
FIG. 1 illustrates one possible configuration for deployment of multiple PDIDs over a wireless communication system capable of providing an alert to a responder, according to various embodiments.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Over the years, a number of drowning detection systems have been developed to improve safety at aquatic facilities, by detecting when a person is in the process of drowning.

However, these systems have fundamental shortcomings. For example, such systems are designed on the premise of reactively looking for drowning victims, as opposed to proactively tracking every swimmer for behavior that may indicate increased risk of drowning and lead to earlier identification of dangerous situations. Other systems also lack built-in redundancy at the device and system level, which leads to higher rates of missed incidents ("false negatives"). Finally, various existing systems place a high operational burden on the staff of swimming facilities, which has led to low market adoption and usage. Thus, there remains a need for a drowning detection system that addresses these issues.

Potential drowning incident detection systems are disclosed that may be installed to monitor an aquatic setting, such as a swimming pool or other swimming area. In various embodiments, the system employs a series of wireless devices, referred to herein as potential drowning incident detectors (PDIDs). Each swimmer using the facility wears a PDID, with the PDID serving to track the swimmer and provide the means by which a potential drowning incident may be detected. Each PDID in turn is in wireless communication with a hub or base station, which acts as a monitor to detect a potential drowning incident, and provide notification to a person or persons responsible for monitoring the facility upon detection of a potential drowning incident. Notifications may be provided in a variety of ways, including audio and/or visual alerts issued by the hub or base station, alerts provided directly to a wireless device worn by a person monitoring the facility (which also may be audio and/or visual), or a combination of the foregoing or another suitable way of notifying or otherwise alerting a monitor of a potential drowning in progress.

Various embodiments of PDIDs are comprised of at least one, or a pair of, waterproof transceiver(s), attached to headgear. When the PDID is submerged for a period of time such that wireless signals transmitted from the PDID are not received by the aforementioned hub or base station, sometimes collectively referred to as a "sensor hub" or simply "hub", an alert or warning may issue from the sensor hub and/or from one or more devices that may be worn by a monitor of the aquatic facility, such as a lifeguard. Further, the sensor hub may include a telecommunications device that allows it to connect to a wireless telecommunications network, for various purposes described below, such as an exchange or transfer of data.

Each sensor hub, in various embodiments, can act as a stand-alone hub to monitor a plurality of PDIDs. Some embodiments of the disclosed system may support scaling by adding additional hubs, which may inter-communicate to form a mesh network, thereby allowing for a single system to cover an aquatic facility or swimming area of nearly any arbitrary size. Further, such a mesh network may be configured to provide zoned alerts, as will be discussed below, so that lifeguards or monitors closest to a potential drowning incident are first notified to minimize response time.

Embodiments of the disclosed system may also support and augment industry-standard policies and procedures related to the management of swimming or aquatic facilities. For example, it is common practice in large swimming facilities to have multiple lifeguards monitoring a large swimming area, with each lifeguard assigned to a specific zone such that 100% of all swimming areas are monitored by on-duty lifeguards. Therefore, in addition to detecting potential drowning incidents, embodiments of the disclosed systems may be configured to track all swimmers in the swimming facility, so as to avoid "false positive" alerts or warnings that are generated when monitored swimmers leave one swimming zone, such as a shallow or entrance area of a body of water, to swim in the deeper section of the water, which may be within a different designated swimming zone and also under the supervision of a different lifeguard. The disclosed systems also enable facility staff to proactively manage lifeguard resources to increase focus on at-risk swimmers and overcrowded swim zones to address unsafe situations and more quickly detect drowning incidents.

In another possible usage, many people, particularly those residing in locations known for high temperatures, enjoy having a personal pool at their home for use. In these instances, there is unlikely to be a lifeguard or even a trained supervisor, or even anything more effective than a simple pool cover to avoid potential accidents when the pool is not in use. In some embodiments, the disclosed system may be implemented in a domestic market, at-home format which may also be able to protect residential swimmers and their children from drowning accidents in a similar way to those discussed above for pools and open water settings. Additionally, in some embodiments the disclosed system may also be paired with a smart home system, such as Amazon Alexa or Google Home, and a control application for the system may be interoperable with the smart home system.

In some embodiments, the disclosed system may also partner with health monitoring applications as selected, and may collect and/or display health-relevant sensor data from the wearables in advantageous formats. In some embodiments, the system may be enabled to interoperate with health monitoring applications executed by a smart home system, a mobile phone or other personal smart device, dedicated personal GPS sport tracking devices, or other systems.

Used solely as a monitoring and prevention system for drownings, in particular in open or natural water where visibility is low under the surface, the submersion trackers may implement the first step in identifying a potential drowning incident. While the settings may be customizable to any length of time (in order to accommodate effective age distinctions between children or beginning swimmers who can't hold their breath for as long as adults or experienced swimmers), e.g., 10 seconds, 20 seconds, or 30 seconds, a selected default range in one embodiment may be full submersion for 30 seconds before an alert is triggered and detected by the tower hub. 30 seconds may be a good default for general applications because it is enough time to confirm that the swimmer has been under the water for an unusually long time, but not enough to cause serious bodily harm before lifeguards are notified in the event of an actual drowning incident. Holding one's breath for extended periods has been shown to trigger rare medical conditions which may put the swimmers at even more risk if the submersion has not been detected promptly. In some embodiments, the submersion tracker, in combination with the heart rate monitor or other biosensors, may also be able to send an alert before a 30 second default time duration if an anomaly in the biosensors is detected together with full submersion.

In some embodiments, the WAVE system may implement any of a number of techniques to perform position tracking of the swimmer wearables and/or the monitor wearables. For example, in some embodiments, the swimmer wearable may include a GPS tracker or other RTLS tracker to monitor and track the location of each swimmer. Location tracking has a variety of benefits in this context, particularly in open or natural water settings where visibility is low under the surface and boundaries may extend substantially farther than an average pool size. In a non-limiting example, utilizing the WAVE drowning prevention system during open water competitions, such as in the swimming component of a triathlon, would not only allow for real-time location tracking of each swimmer as a way of keeping tabs on them, but would also allow for quicker and easier rescue in the event of a drowning incident. Example open-water auxiliary components of various WAVE system embodiments are further described below.

In aquatic center and pool settings, RTLS trackers may also be used as an addition to a swimmer management and drowning prevention system. In a non-limiting example, real-time RTLS trackers may provide real-time alerts to lifeguards when one area of the pool becomes overcrowded, indicating that another lifeguard needs to move to that area for additional protection. Additionally, in an embodiment where the wearables registered with distinguished monitoring modes for different swimmers (e.g., beginners and experienced swimmers), RTLS tracking may also enable the system to send a lifeguard a minor alert when a beginner swimmer is moving into the deeper end of the pool as an indication to either keep a closer watch, or direct the swimmer back into the shallower part of the pool. In some embodiments, RTLS-tracking may also be embedded in the lifeguard bracelets (discussed in more detail below) so that during a potential drowning incident, the closest one or more lifeguards in relation to the submerged swimmer may be alerted first.

As used herein, the following definitions may apply; however, no strict construction of the words defined is intended:

"Alert" is an audible, visual and/or vibrational signal or text/graphic message (including a badge or icon) that is displayed on a telecommunications device by a wireless signal from the server or sensor hub in response to a potential drowning incident involving a registered swimmer.

"ANT™" is an ultra-low-power, short-range, (2.4-GHz) network protocol designed for sensor networks and similar application. Developed and sold by Dynastream Innovations Inc., a subsidiary of Garmin, ANT supports encrypted communications (e.g., via AES-128 encrypted channels).

"Baseline signal" is the strength and quality of wireless signals (or data packets) transmitted by the waterproof transceiver when not blocked or otherwise attenuated as a result of being submerged in water.

"Blocked" means a wireless signal has not been received by the server (or sensor hub) from a PDID for a predetermined period of time, e.g., about 15 seconds, or the server (or sensor hub) has not received a predetermined percentage of the baseline signal, e.g., 50% of the baseline signal, within a predetermined period of time, e.g., about 15 seconds. It will be appreciated that the time interval that designates a "blocked" wireless signal can be varied. For example, a pool may set the time at 15 seconds for younger children, e.g., children less than four years old, or 30 seconds for older children who have passed a "deep water" swimming test.

"Cellular voice/data network" means a digital cellular network used by mobile phones and/or computers (including laptop computers). Cellular voice/data network includes cellular networks based on the Global System for Mobile Communications (GSM), and the Universal Mobile Telecommunications System (UMTS). Data may be transported using: GPRS (General Packet Radio Services) and EDGE (Enhanced Data rates for GSM Evolution); High Speed Packet Access (HSPA); the Long-Term Evolution (LTE) standard based on the GSM/EDGE and UMTS/HSPA technologies; and the Worldwide Interoperability for Microwave Access standard (Wi-Max); and improvements on the foregoing (e.g., LTE-Advanced, Wi-Max Advanced).

"Designated swimming area" means an area of a pool or other expanse of water used (e.g., lake, bay, ocean) that is monitored and in which registered swimmers are permitted to swim. Designated swimming areas may be defined by one or more of ropes, buoys, or other marker.

"Designated swimming zone" means a sub-area of a designated swimming area in which a registered swimmer is allowed (i.e., permitted) to swim. For example, registered swimmers who are below a designated height and/or age, and/or who have not passed a test demonstrating a level of swimming skill, may be assigned to and allowed to swim only within a designated swimming zone, such as the "shallow end."

"Geopositioning" is a technology that locates, triangulates or facilitates the location of a registered swimmer relative to the designated swimming area.

"Headgear" is a band (including, in preferred embodiments, a headband), cap, or other device attached to or worn on or around the head of a registered swimmer.

"Ingress protection rating" (or IP rating) is a standard promulgated by the International Electrotechnical Commission and consists of the letters IP followed by two numbers, X and Y. IP rating classifies the degree of protection provided by the enclosures of an electronic device. The first number of the IP rating ("X") ranges from 0 to 6, and represents the degree of protection provided against the entry of foreign solid objects, such as fingers or dust. The second number of the IP rating ("Y") represents the degree of protection against the entry of moisture, and ranges from 0 through 8. Where "X" is 6, the device is protected against fingers, wires, screws or similar objects (i.e., less than 1 mm,) as well as dust. Where "Y" is 7, the device is protected from immersion in water with a depth of up to 1 meter (or 3.3 feet) for up to 30 minutes. Where "Y" is 8, the device is protected from immersion in water with a depth of more than 1 meter. (The device specifications provide the depth of protection.)

"Last known location" means the position of the registered swimmer based on geopositioning immediately prior to detection of a potential drowning incident or an out-of-bounds event.

"Low-energy device" is understood by the skilled artisan to describe the management, storage and consumption by batteries that power the mobile devices, including PDIDs of the present disclosure. Through circuitry, transduced output power is conditioned, energy is stored and power is delivered (e.g., to a sensor).

"Mesh network" is a wireless local area network (WLAN) in which nodes on the network (workstations or other telecommunications devices) are connected to each other.

"Monitor" means checking the status of a registered swimmer in real-time to determine if a potential drowning incident has occurred or if the registered swimmer is out-of-bounds. Monitoring is accomplished by the receiving and processing of wireless radio signals transmitted from a waterproof transceiver via the wireless communications system, which may be a server or sensor hub and generating an alert or warning.

"Out-of-bounds" means a registered swimmer is outside a designated swimming area. This may be determined using geopositioning techniques, e.g. GPS location.

"Non-swimming zone" means an area within a swimming facility that is not designated for swimming. This could include seating areas, dining areas, bathroom facilities, for example.

"No swimming allowed zone" means a body of water that is not safe for swimming or not supervised by lifeguards.

"Peer-to-peer model" is a relationship in which each node functions as both a client and server.

"Potential drowning incident" means the PDID has not transmitted a wireless signal for a predetermined period of time, e.g., about 15 seconds, or the server has not received 50% of the baseline signal. It will be appreciated that the time interval which would trigger an alert can be varied. For example, a pool may set the time interval at 15 seconds for younger children, e.g., children less than four years old, or 30 seconds (or more) for older children who have passed a "deep water" swimming test.

"Real-time" or "real-time communication" means wireless signals are transmitted from the waterproof transceivers at a frequency of at least one signal (data packet) per 200 ms, and the signal is received by the server or sensor hub with negligible latency. The term "real-time" is to be understood as synonymous with "live."

"Registered swimmer" is a person that wears (dons) a PDID and is being monitored on a wireless communication system.

"Responder" means a lifeguard or person responsible for the safety of a registered swimmer. Responders may include, in certain embodiments, a camp counselor or other personnel.

"Sensor" is a device that detects and responds to input from the physical environment and generates output in the form of a signal. Non-limiting examples of input include one or more of light, heat, motion, moisture, or pressure. In the devices and methods of the present disclosure the output may be a signal that is converted to human-readable display on the PDID of the present disclosure or a buoy, rope or other marker that defines areas in which registered swimmers are monitored. The sensor signal is also transmitted electronically over a wireless communication system for further processing.

"Sensor hub" or "hub" is a wireless access point that employs a multipoint control unit, coprocessor or digital signal processor to compile and process wireless signals (data) received from PDIDs connected to the wireless communication system. The sensor hub may be connected to the Internet, to a server and/or to separate (i.e., standalone) telecommunications device. The sensor hub may, in certain embodiments, have its own central processing unit capable of generating an alert or warning. One non-limiting but preferred example of a sensor hub that operates on Bluetooth® wireless communication system is the CASSIA HUB® (Cassia Networks, Inc., San Jose, Calif.).

"Submerge" means to sink below or go under the surface of water.

"Swimming area" means a designated area for aquatic recreation or competition, such as pool facility, spa, lake, pond or other body of water where areas can be designated for aquatic recreation or athletic events.

"Swimming zone" means a designated area within a swimming area, which is utilized or monitored as a separate resource from other zones of operation.

"Telecommunications device" means a cellular phone, handheld or tablet computer, laptop computer, desktop computer or other electronic device (including a wearable device such as a bracelet or watch) capable of transmitting, receiving, storing and/or processing (e.g., modulating) or analyzing wireless radio signals via a wireless communications network.

"Ultra-wideband" is a wireless communications technology for transmitting large amounts of digital data over a wide spectrum of frequency bands with very low power for a short distance.

"Warning" is an audible, visual and/or vibrational signal or text/graphic message (including a badge or icon) that is displayed on a telecommunications device by a wireless signal from the server or sensor hub when the registered swimmer is determined to be out-of-bounds.

"Waterproof transceiver" means device that can transmit and receive a wireless radio signal and has ingress protection rating of IP67 or IP68.

"Wireless access point" (commonly abbreviated "WAP") is central transmitter and receiver of wireless radio signals. WAP is sometimes referred to in the present application as a hub.

"Wireless communication system" means a wireless local area network, a wireless personal area network, a peer-to-peer network, or a cellular voice/data network comprised of a plurality of wireless nodes selected from the group of transmitters, receivers, and transceivers. Some nodes are "slaves" which are monitored; other nodes, e.g., the router/hub, acts as a manager or data aggregator for connections to monitor(s). Some nodes may also serve as repeaters to relay data from one node to another. Wireless signals transmitted over the wireless communication system may be encrypted. Communications protocols/technologies used for transmitting and receiving wireless signals by the devices and methods of the present disclosure include, but are not limited to Bluetooth®, ANT™, Zigbee® and ultra-wideband.

FIG. 1 depicts the various components of a system 1, according to a possible embodiment, for detecting potential drowning incidents, and may be configured to provide an alert to a responder 50. System 1 includes one or more PDIDs 10a, 10b, 10c and 10d (generically, PDID 10), each worn by a swimmer 20a, 20b, 20c, and 20d (generically, swimmer 20). Each PDID 10 is configured to generate a wireless signal, which is received and monitored by sensor hub 70. The hub 70 may be configured to communicate with a server 80, which may be remotely located. Server 80, in some embodiments, may generate a signal to the responder 50 and trigger a strobe or siren 90. Responder 50 may include a wearable 60 (also referred to herein as a "lifeguard wearable"), which may be configured as a telecommunications device to at least receive the signal from server 80. The server 80 also can be configured to communicate with a control tablet 100. In some embodiments, hub 70 and server 80 may be integrated into a single unit.

Figure 2A:
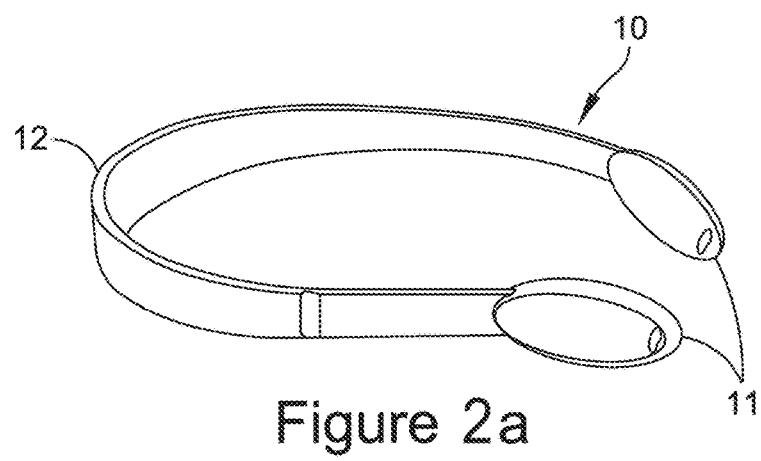
FIGS. 2a, 2b, 2c, and 2d illustrate an example potential drowning incident detector (PDID), according to various embodiments.
Figure 2B:
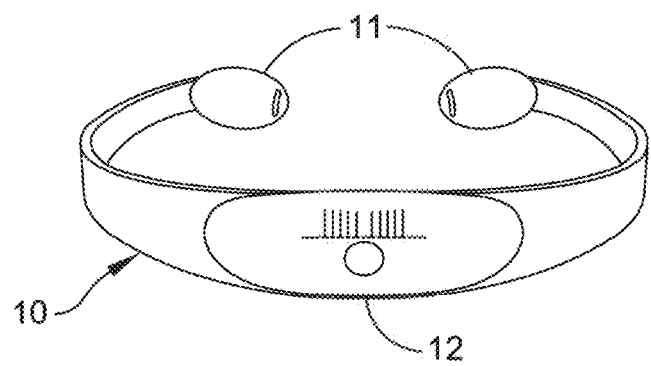
Figure 2C:
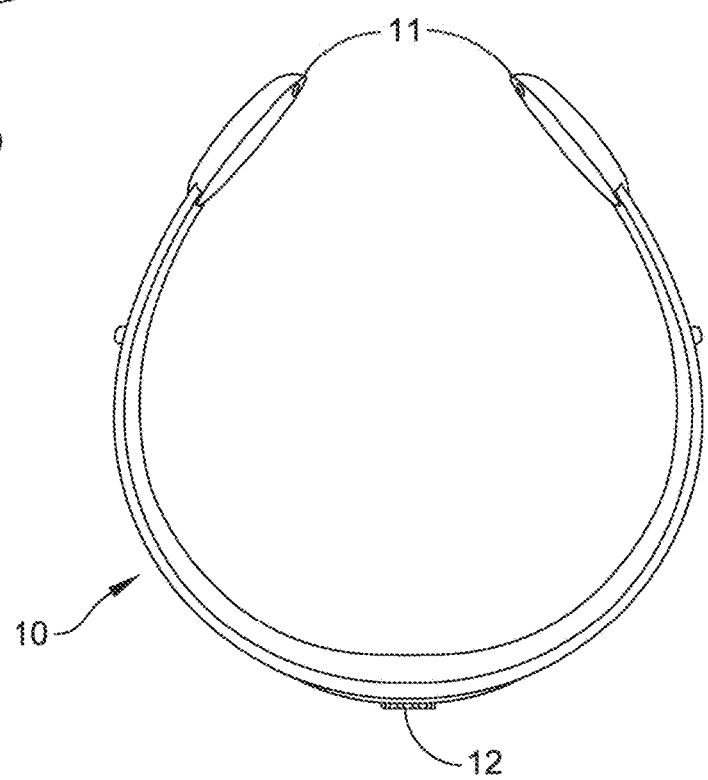

FIGS. 2a-2c depict a first possible embodiment of PDID 10. PDID 10 is designed to be worn around the head of a registered swimmer. In various embodiments, the PDID 10 has a at least one, and as depicted, pair of signal generators 11. Each signal generator 11 may be waterproof or secured within a waterproof housing. Further, in some embodiments, each signal generator 11 may be equipped with its own antenna. As will be discussed further below, each of the signal generators 11 in the pair is assigned, and transmits, a unique identification code (ID Code), distinct from all other PDIDs 10 and associated signal generator 11. Thus, each PDID 10 transmits one or more unique ID codes that can be associated with a particular swimmer wearing a given PDID 10. For example, swimmer 20a in FIG. 1 may don (i.e., wear) a PDID 10a in which the left and right signal generators 11 are assigned codes 1L and 1R, swimmer 20b may don PDID 10b where its signal generators 11 are assigned codes 2L and 2R, swimmer 20c may don PDID 10c where its signal generators 11 are assigned codes 3L and 3R, etc. It should be understood that each unique ID Code may be any arbitrary string of characters subject only to the requirements of a given embodiment; 1L, 1R, 2L, 2R, etc., are examples for illustrative purposes only, and not intended to reflect any particular format or data requirements.

Figure 3A:
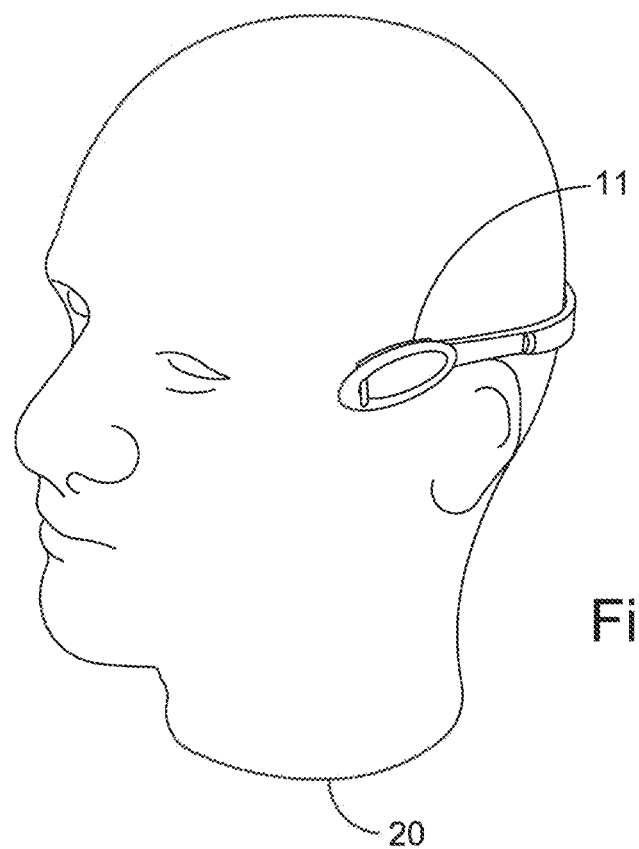
FIG. 3a illustrates the example PDID in FIGS. 2a, 2b and 2c being worn by a swimmer, according to various embodiments.
Figure 3B:
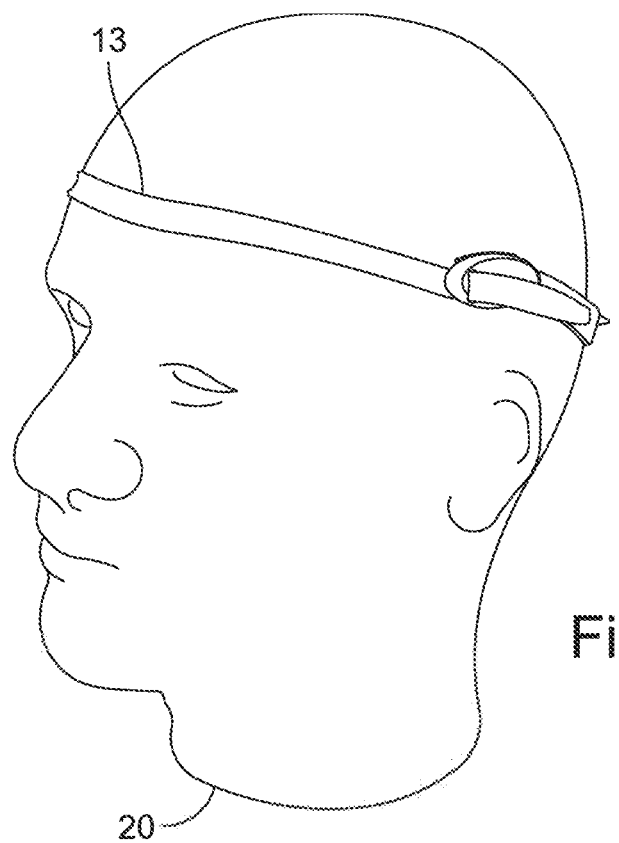
FIG. 3b illustrates the example PDID in FIGS. 2a, 2b and 2c being worn by a swimmer with an elastic strap positioned across the forehead of a registered swimmer, according to various embodiments.

In the embodiment depicted in FIGS. 2a-2c, the PDID 10 is designed to position the signal generators 11 so that they rest generally above and forward of the ears, above and behind the eyes, on top of the areas of a person's head commonly understood to be the temples. This positioning may be more clearly seen in FIG. 3a, which illustrates the PDID in FIGS. 2a, 2b and 2c being worn properly by a registered swimmer 20. In embodiments, a first signal generator 11 is positioned near the right temple of the swimmer, and a second signal generator 11 is positioned near the left temple. The PDID 10 sits behind (or rest on) both ears, and wraps behind the head. In this position, when the swimmer's head is fully or partially under water, one or more of these signal generators will submerge, and its signal transmission of assigned codes 1L and 1R will be attenuated, such that a hub 70 monitoring the swimming zone for the transmission of signals will register the absence or presence of the signals associated with assigned codes 1L and 1R.

In some embodiments, the PDID 10 is fabricated from a semi-flexible material, such as polycarbonate or another suitable plastic or similarly semi-flexible material, and is configured as a band 16 that is positioned on the head of the swimmer 20. In such embodiments, the PDID 10 may be a curved headband with two signal generators 11 which are separated from each other by about 120 to 180. The PDID 10 may be configured to float (not submerge) and may be equipped with at least one, or more than one, sensor that detects whether the PDID 10 is being worn properly by a swimmer 20. "Worn properly" means the band 16 is positioned on or around the head of a swimmer 20 in a prescribed position. By way of non-limiting example, with reference to FIGS. 1a, 1b and 1c and FIGS. 2a and 2b, a PDID 10 is being worn properly by a swimmer 20 if the first signal generator 11 is positioned near the right temple, and a second generator 11 is positioned near the left temple and the band 16 sits behind (or rests on) both ears, and wraps behind the head.

As seen in FIGS. 2a-2c, each of the ends of the PDID 10 has a signal generator 11. The PDID 10 may also have control circuitry 12, which may include an on/off switch and one or more indicators (e.g., of battery and/or signal strength). Band 16, being semi-flexible, may act as a spring and exert an inwardly-directed force (e.g., biasing the two signal generators 11 towards each other and the band 16) commensurate with a spring constant defined by the material, size, and construction of band 16. PDID 10 may also be crafted with radial variation in spring constant, with thinner or more reinforced structural sections at different portions around the general, head-accommodating, modified partial annular shape of the headset, to fine-tune the tendency of the PDID 10 to grasp a swimmer's head both securely and comfortably. Some embodiments of the PDID 10 have been designed based on empirical study of headset structure found to enhance both user comfort and secure placement on a variety of swimmers with a typical range of head dimensions. In some embodiments, the PDID 10 may be lightweight, such as with a weight of three ounces or less, which may help keep the PDID 10 comfortable.

Control circuitry 12 may provide various functions, such as providing power to one or both of the signal generators 11. Power may be supplied by an internal battery, in various embodiments, which may be managed and/or charged at least in part by control circuitry 12. In some such embodiments, control circuitry 12 may include coils or other circuitry to receive energy from a wireless charger, such as via induction. In other embodiments, one or both of the signal generators 11 may include its own power source, but still be switched on or off from control circuitry 12. Control circuitry 12 may handle activation and deactivation of PDID 10, including its constituent components. In some embodiments, control circuitry 12 includes one or more sensors, e.g. accelerometers, moisture detectors, etc., to be discussed in more detail below. As mentioned above, control circuitry 12 may include or otherwise be connected to one or more controls and/or indicators, including alert lamps, sound generators, switches, buttons, etc.

In addition to controlling power/activation of its associated PDID 10, control circuitry 12 may also be responsible for on-board processing to provide some functionality as lane keeping, reminding a swimmer 20 to surface, reminding a swimmer 20 to remove the PDID 10 before leaving, etc., as may be discussed variously throughout this disclosure. In such embodiments, control circuitry 12 may have processing hardware, such as an embedded microcontroller and associated firmware. In some embodiments, control circuitry 12 may include one or more antennas, or may be in communication with one or more antennae that are part of either or both signal generators 11. Via the antenna, control circuitry 12 may be configured to receive a transmission from a hub 70. In other embodiments, the transmission may trigger the control circuitry 12 to provide the aforementioned functionality, e.g. triggering a vibration or other alert. (It will be recognized that some alerts that issue when the PDID 10 is not reachable by the hub 70, e.g. underwater, may still require processing local to a PDID 10.) In such embodiments, control circuitry 12 may not need to have processing hardware, instead relying upon remote components of system 1 to process any transmitted data, and then transmit back to the PDID 10 instructions or triggers to effect the desired alert(s).

Figure 2D:
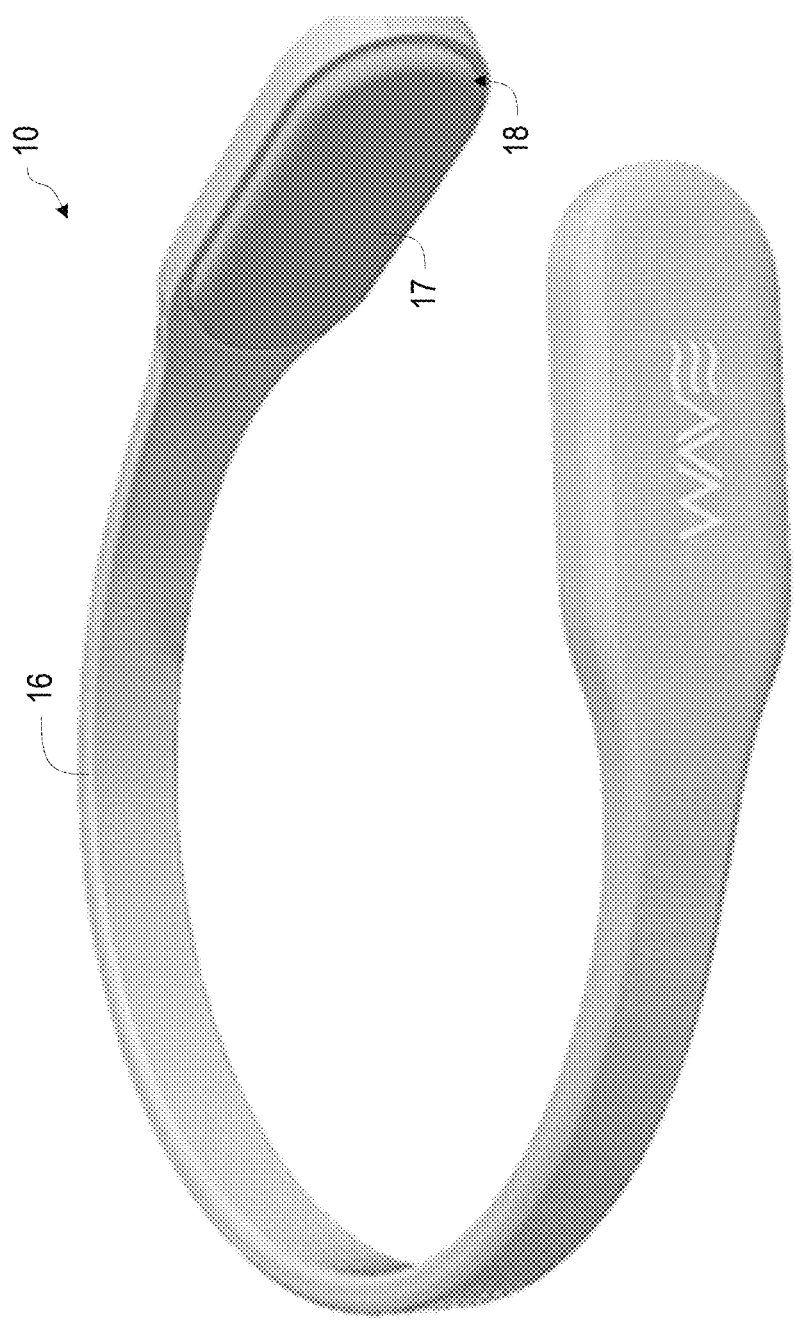

Referring to FIG. 2d, a layer of waterproof cushion 17 may be disposed on the inward surfaces 18 of each of the embedded signal generators 11. The cushions 17 may make the PDID 10 more comfortable for the user, and may buffer the spring constant of the band 16, to further help ensure that the PDID 10 remains correctly positioned on the swimmer's head in any likely swimming or aquatic activity scenario. The cushions 17 may each have their own lateral spring constant (measured laterally toward and away from the surfaces of a swimmer's temples, in opposition to the local lateral component of the radial spring constant of the band 16), thereby helping ensure that the combined compression force of the cushioned ends of the PDID 10 against the swimmer's head are conducive to both user comfort and secure positioning of the PDID 10 on the swimmer's head. The cushions 17 may also be low-density or low-specific gravity and enable flotation of the entire PDID 10. In some embodiments, the PDID 10 may be lower density or lower specific gravity than water apart from cushions 17, and so may float in water in various other configurations. In some embodiments, the waterproof cushions 17 are also antimicrobial to enhance the safety and usable lifespan of the PDID 10.

Due to the one-size-fits-all design, on children younger than about four years old, the cushions 17 and associated signal generators 11 rest towards the front of the temple, which, while still comfortable to wear, also provides additional safety since it brings the signal generators 11 farther forwards toward the face, and in particular the nose and mouth, and therefore may provide additional margin of accuracy for facial submersion detection for those at the highest risk. In some embodiments, a smaller version of the PDID 10, possibly in the form of an ankle or wrist bracelet, may be provided for toddlers and infants as needed. Additionally, the PDID 10 headband embodiment may use a precise circumference, diameter, length, shape, and spring constant of radial flexibility around the head, to not only provide the user comfort which encourages them to wear it, but also to make the PDID 10 more hydrodynamic, such that when the user's head is moving through the water, the PDID 10 remains securely in place despite the water resistance, throughout a plausible range of hydrodynamic forces experienced during any likely human swimming or other aquatic activity applications.

In some embodiments, the PDID 10 is also vertically symmetrical in design, so that it can be worn in either vertical orientation, so that it fits and functions identically without regard to it being "right side up" or "upside-down" on a user's head, further supporting the convenience of the user experience. In other embodiments, which may be suitable for very young children who may be prone to prying a wearable off of their heads, a swimmer wearable may be implemented in the form of dual adhesible units, each unit including a signal generator 11, that may be attached directly to the user's temples with a safe and powerful adhesive suitable for fixing the wearable units directly to the skin of the user's head.

Although FIGS. 2*a*, 2*b* and 2*c* illustrate a PDID 10 having two transceivers 11, it should be understood that one signal generator 11 can embody an active device, such as a transceiver or transmitter electronics to generate a signal, and the other signal generator 11 can embody a passive device, such as an antenna, in a manner described in greater detail below. As used herein, either a passive or active device may be referred to as a signal generator, that is configured to generate a wireless signal to a receiver, such as a sensor hub or server. Further, the signal generator may include any type of electronic device capable of generating a wireless signal or some other type of signal detectable by a receiver. In some embodiments, the signal generator 11 comprises a Bluetooth transmitter or Bluetooth transceiver. Each waterproof signal generator 11 may be in real-time communication over a wireless communication system with one (or more of) a server or a sensor hub, and/or a standalone telecommunications device.

Each signal generator 11 may either be manufactured waterproof, e.g. with potted electronic components, or be secured or otherwise installed into a waterproof housing. In some embodiments, the waterproof housing may be separate from the PDID 10, which is configured to accept the signal generator 11 within a waterproof housing. In other embodiments, the PDID 10 may provide the waterproof housing as integral with the PDID 10, in which case an otherwise non-waterproof signal generator 11 may be installed and be protected from water incursion by the PDID 10. Regardless of implementation, "waterproof signal generator" refers to any signal generator 11 as part of PDID 10, which as a unit is made to be waterproof.

In one possible embodiment, the PDID 10 can include a radio (such as a transmitter or transceiver) disposed anywhere on the PDID 10, with the radio having a digital switch that connects to two antennas, with one antenna provided on one side of the PDID 10 and the other antenna provided on the other side of the PDID 10. In such an embodiment, each antenna would be considered a signal generator 11, and the actual radio or transceiver responsible for generating the necessary signals may be located at any suitable location upon the PDID 10, with connections made to each antenna via a wire, cable, or other suitable mechanism. In other embodiments, one of the signal generators 11 may include the transmitter or transceiver, with the other signal generator 11 comprising a passive antenna that is electrically connected to the first signal generator 11. In still other embodiments, each signal generator 11 may be a standalone, separate transmitter or transceiver with its own antenna and dedicated RF generator, independent from the other signal generator 11.

Figure 7:
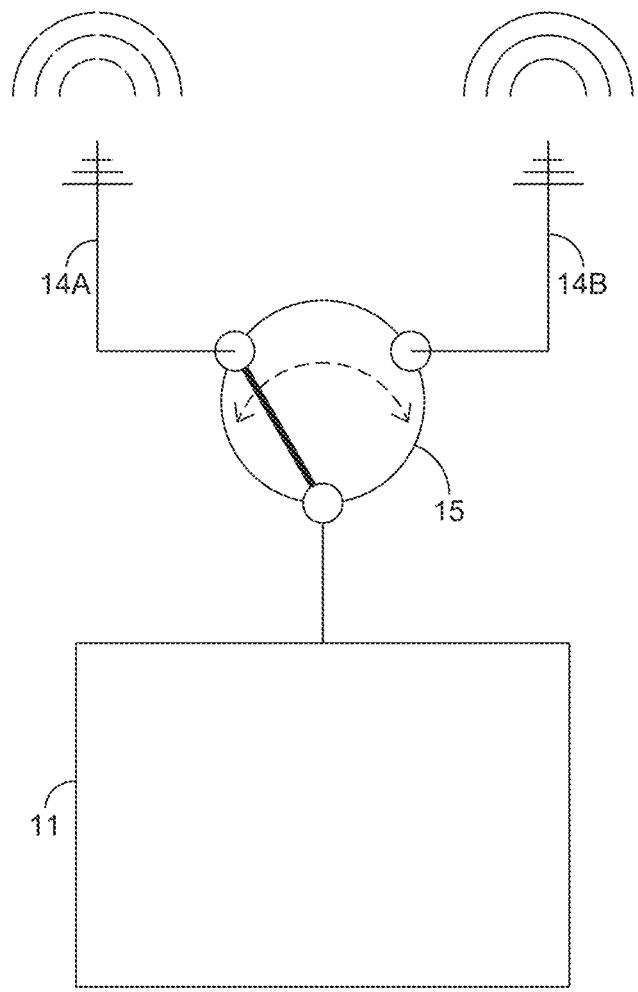
FIG. 7 illustrates a signal generating unit including a single transceiver having a digital switch connected to two antennas, according to various embodiments.

In certain preferred embodiments, with reference to FIG. 7, the PDID 10 has a single signal generator 11, which has two or more separate antennae 14A, 14B, and so on, electronically coupled to the signal generator 11, such that the signal generator 11 transmits its unique identification code via the two or more antennae, either simultaneously or according to an alternating pattern of 14A, 14B, 14A, 14B, and so on, in the case of two antennae. As shown in FIG. 7, the signal generator 11 is electronically coupled to two antenna 14A, 14B. Using two or more antennae (or other passive signal transmitters), the signal generator 11 is able to generate duplicate or repeated signals containing its own unique identification code. The wireless communication system is capable of noticing the absence of the unique identification code from the two or more antennae 14A, 14B, and follows an established protocol based on the absence of the unique identification codes (14A, 14B, . . . ) of the signal generator 11. The signal generator 11 may be positioned on or within a PDID 10 such as a headband, swimming goggle or swimming cap, as discussed herein.

The two antennae 14A, 14B are placed on opposite sides of the swimmer's head, for example on the left and right temple, such that the transmission of the unique identification code will be obstructed by water (the signal will be attenuated as a function of depth under water) as the individual antennae are submerged.

Within this preferred embodiment, and in the case of a number (N) of antennae that are electronically coupled to the signal generator 11, the antennae 14A, 14B would be distributed somewhat evenly across the PDID 10 and around the circumference of the swimmer's head. If a certain portion of the PDID 10 containing an antenna is above water, e.g., antenna 14A, then the unique signal of the signal generator 11 would be received by the system 1, e.g. via hub 70. When all of the "N" antennae electronically coupled to the signal generator 11 are immersed in water, e.g., antennas 14A, 14B, the signal strength of each of the N antennae will be sufficiently attenuated such that the system 1 will fail to receive the duplicated and repeated signals containing the unique identification code of the PDID 10. Upon such an event, the system 1 follows a pre-established protocol, disclosed in FIG. 6, resulting in an alert. In some embodiments, a digital switch 15 is disposed between the signal generator 11 and the antennas 14A, 14B to provide digital signals from the signal generator 11 to the antennas.

The PDID 10 may include a reflective paint or decal(s) on it to aid in the location of the swimmer. For example, rescuers could search using an underwater high power flashlight that they would systematically shine throughout the water during their search, looking for a passive reflection off of the PDID 10 to locate the swimmer. The PDID 10 may also include a light emitting diode (LED) or other dynamically active or visible beacon to aid in the location of the swimmer.

In certain embodiments, in which the PDID 10 is implemented as a headband as described above, the PDID 10 may be secured by an elastic strap 13 that is placed or positioned across the forehead of the swimmer 20. FIG. 2*b* shows the PDID 10 of FIGS. 2*a*, 2*b* and 2*c* on a swimmer 20 with an elastic strap 13 positioned across the forehead of the swimmer 20. As shown, the strap 13 is attached the two ends of the PDID 10.

Figure 4A:
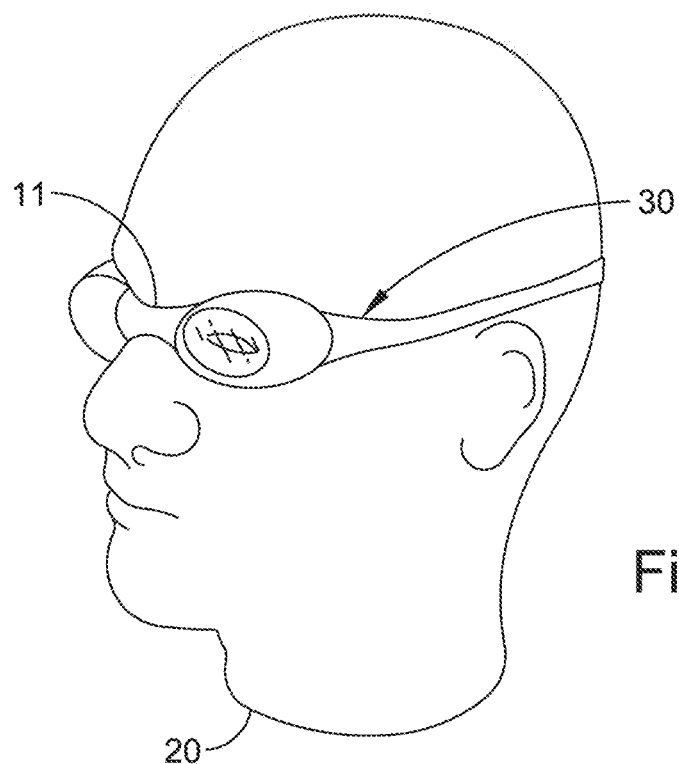
FIG. 4a illustrates a second example PDID in the form of swimming goggles, according to various embodiments.
Figure 4B:
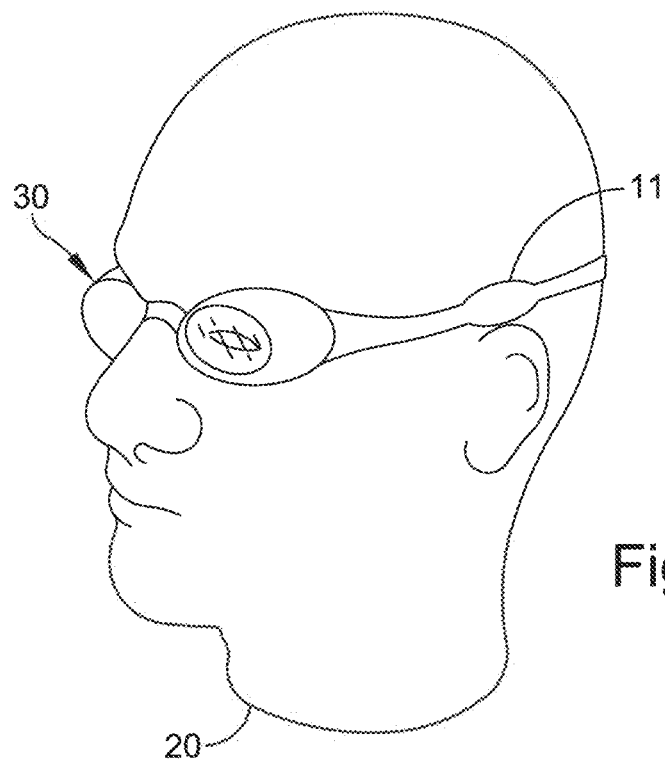
FIG. 4b illustrates another example PDID in the form of swimming goggles, according to various embodiments.

In other embodiments, the PDID 10 may be in the form of a pair of goggles or a swimming cap having one or more waterproof signal generators 11. For example, FIG. 4*a* illustrates a PDID 30 in the form of swimming goggles, with a waterproof signal generator 11 attached to the bridge of the goggles. In this embodiment, a single signal generator 11 is embedded in or mounted on the bridge of the PDID 30 over the swimmer's nose to effectively determine that the swimmer's face is fully submerged and unable to breathe. FIG. 4*b* illustrates a second possible embodiment PDID 30 in the form of swimming goggles, with a waterproof signal generator 11 attached to the goggles near the swimmer 20's left temple. In this embodiment, a first waterproof signal generator (not shown) is positioned near the right temple of the swimmer 20, and a second waterproof signal generator 11 (shown) is positioned near the left temple of the swimmer 20, above the ear of the swimmer 20.

Figure 5A:
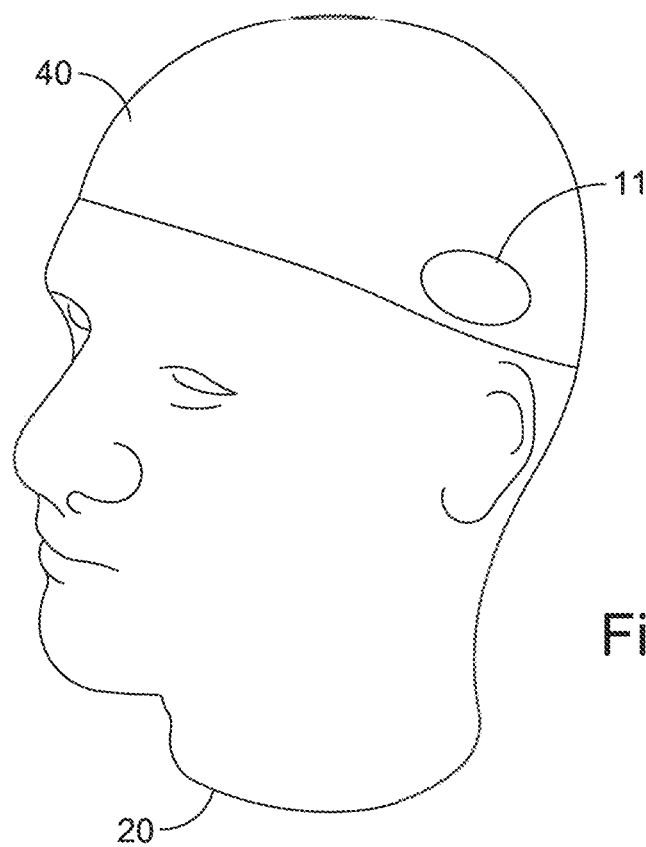
FIG. 5a illustrates an example PDID in the form of a swimming cap with two waterproof transceivers, according to various embodiments.

In another embodiment, FIG. 5*a* illustrates a PDID in the form of a swimming cap 40 with two waterproof signal generators 11. A first waterproof signal generator (not shown) is positioned near the right temple of a swimmer 20, and a second waterproof signal generator 11 (shown) is positioned near the left temple of the swimmer 20.

Figure 5B:
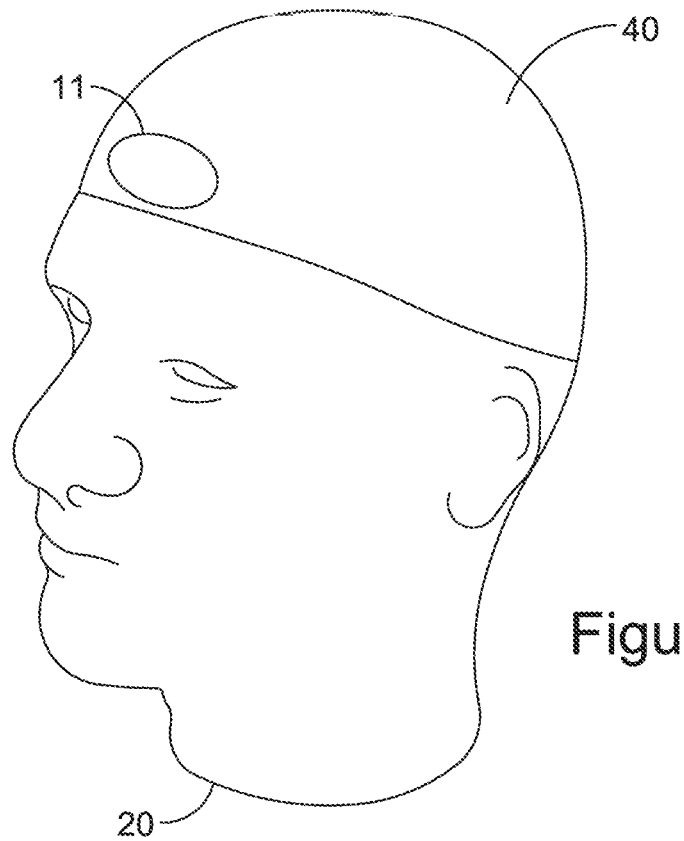
FIG. 5b illustrates an example PDID in the form of a swimming cap with a single waterproof transceiver, according to various embodiments.

In another embodiment, FIG. 5*b* illustrates a PDID in the form of a swimming cap 40 with a single waterproof signal generator 11 attached to the cap and positioned above the center of the forehead of the swimmer 20.

In another embodiment, the system 1 may include PDIDs 10 that comprise separated wearables for children and adults, or alternately, for beginner swimmers and experienced swimmers. In some embodiments, these different PDIDs 10 may be visually distinguished by size, color, or design (e.g., patterns or licensed characters that are popular with younger children).

In some embodiments, the embedded signal generators and potentially other beacons (discussed below) of a PDID 10 can be attached either permanently or temporarily in other swimmer wearables in a similar manner, such as within or with small clips which attach to either side of a pair of goggles—again, placement will typically be directly on top of a swimmer's temples. Similarly, in a swim cap embodiment, the signal generators 11 may be embedded in both sides of the cap, above and forward of the swimmer's ears, on top of the temples. In some embodiments, signal generators 11 that are compatible with system 1 may be embedded in swim caps or goggles designed by companies already well-known in the water sports industry for use in additional settings outside of casual swimming, such as during intensive training or during competitions.

Although the depicted embodiments illustrate PDIDs 10 with either one or two signal generators 11, it should be understood that other embodiments may have additional signal generators 11, as may be needed to more accurately detect a potential drowning incident and/or to collect additional non-drowning related data, e.g. swimmer position or orientation within the water, amount of splashing, etc. Further, while PDIDs 10 are depicted as head-mounted, other embodiments may utilize PDIDs 10 that secure to a different part of the swimmer, either additionally or alternatively to the head-mounted PDID 10.

In some embodiments, one or more signal generators 11 on a PDID 10 is implemented as a Bluetooth Low Energy (BLE) beacon. A BLE beacon not only can keep the cost of each PDID 10 relatively low, but also allow for a comparatively simple installation. In some examples, once a PDID 10 equipped with BLE beacons is activated (discussed below), the BLE beacons simply broadcast BLE signals in device advertising mode, and a nearby hub 70 tracks the BLE beacons from the advertising mode signals without needing to perform a cumbersome pairing with the beacons, and without set-up needed by the installer or operator of system 1. Additionally, the use of BLE beacons for signal generators 11 allow for ultra-frequent check-ins, pinging back and forth with the sensor hub 70 once per second (or another periodic polling time suitable for a given implementation of system 1) that any swimmer PDID 10 is active. Each signal generator 11 may include a power source, or be powered externally, such as by control circuitry 12. In some embodiments, the power source may be a rechargeable battery, such as a nickel metal-hydride (NiMH) or lithium-ion battery, which may be recharged from sensor hub 70, potentially under the control of or via control circuitry 12. In other embodiments, the signal generator 11 may utilize an inexpensive lithium watch battery as its power source, which may or may not be rechargeable, and may or may not be replaceable.

In some embodiments, either the left or right-hand signal generators 11 are able to send a signal to the sensor hub 70, depending on which is in the strongest signal point. However, to avoid unnecessary double-alerts and/or confusion in the collected data signals, in this example, each signal generator 11 sends a unified signal as a single identified user, i.e., each PDID 10 is tracked as a singular pair of signal generators 11. As discussed above, each signal generator 11 may have its own unique identifier code, such as a unique MAC address. Therefore, each PDID 10 may share at least two unique MAC addresses, one to represent each of the left and right signal generators 11. This way, data can be seen from each individual signal generator 11 if desired, but in real-time use, the system 1 may designate one PDID 10, worn by one swimmer, with one unique identifier comprising a pair of unique identifier codes (e.g., a pair of unique MAC addresses) that the sensor hub 70 is able to track and locate.

In other embodiments, the unique identifier may be distinct from the pair of unique MAC addresses, e.g. may be unique on its own and not purposefully comprised of any portion of either of the pair of unique MAC addresses. For example, one or both signal generators 11 may be configured to transmit a code that is unique to the PDID 10, but distinct from each signal generator 11's unique MAC address. In some embodiments, one or both signal generators 11 may transmit the unique PDID 10 code as well the signal generator 11's unique MAC address. In such an example, then, the sensor hub 70 may receive up to three codes from a PDID 10 equipped with two signal generators 11: two unique MAC addresses comprising each signal generator 11's separate transmission of its unique MAC address, and the unique code assigned to the PDID 10, transmitted by one or both signal generators 11. The three separate codes may allow system 1 to track the swimmer's head position while not fully submerged, e.g. when one or the other side of the swimmer's head is submerged, such as while swimming certain strokes, the sensor hub 70 will receive one of the unique MAC address and, if PDID 10 is so configured, the unique code of PDID 10. By identifying which MAC address is received and which one is attenuated or missing, the sensor hub 70 can determine the rough orientation of the swimmer's head. When the swimmer's face is submerged in a potential drowning incident, none of the two or three unique codes would be received.

In addition to signal generators 11, a PDID 10 may include various types of beacons, sensors, or other signal generating units embedded on both the left and right sides of a headset or other wearable in order to send alert signals to a hub 70 of system 1, or another device that is part of or in communication with system 1. Further, in some embodiments, PDIDs 10 may be embedded with a variety of additional sensors, potentially including, but not limited to, accelerometers (discussed below), perimeter monitors, submersion trackers, flex sensors, gyroscopes, heart rate monitors, Real-Time Location Services (RTLS) (e.g., Global Positioning System (GPS), Ultra Wide Band (UWB)) trackers, and/or other variations of biosensors or physics sensors which may assist with assessing swimming performance. RTLS technologies may include GPS or any other technology for real-time location tracking. The additional sensors and/or signal generating units may be integrated into one or more of the signal generators 11, or may be housed as standalone units. As with signal generators 11, the additional sensors and/or signal generating units may be configured or enclosed so as to be waterproof. By fully enclosing all desired sensor technology, the need for any exposed buttons or switches may be removed, not only making the swimmer wearables more sleek, hydrodynamic, and comfortable in design, but ensuring that they are fully functional without user intervention.

In some embodiments, PDID 10 may be equipped with one or more accelerometers, which may be equipped to one or both signal generators 11, to the control circuitry 12, or to another suitable location on PDID 10. In addition to providing motion information, e.g. helping to track the swimmer's motions, one or more of the accelerometer(s) may help to activate and/or deactivate the PDID 10 during use. For example, when a control circuitry 12 within a PDID 10 detects a signal from the accelerometer indicative of activity, such as when a PDID 10 previously at rest (e.g. stored on a hub 70, charging station, etc.) is picked up by a user, the control circuitry 12 may, in response, turn on the PDID 10, and may further communicate a new swimmer registration or registration session to the sensor hub 70. Before the processing unit turns on the PDID 10, the PDID 10 may previously have been in a low-power mode with just enough power to enable the control circuitry 12 and associated accelerometer to function to detect an activating motion, and possibly implement other low-power priority functions, such as track the remaining energy in the battery, detect if the remaining battery energy is below a critical threshold, and respond to such a detection by activating a warning not to use the PDID 10 until it is properly charged. Similarly, when the control circuitry 12 of the PDID 10 detects, via the accelerometer, a lack of motion for a selected period of time, such as due to the user's removal of the PDID 10 at the end of swimming, the control circuitry 12 may put the PDID 10 into a sleep mode to conserve the energy in the battery. In one example, the control circuitry 12 may respond to a duration of one hour of inactivity (e.g., one hour without detecting any accelerometer signal above a threshold of negligible motion or signal noise) by deactivating the PDID 10 or putting the PDID 10 into low power mode.

Additionally, control circuitry 12 may be able to detect, via the accelerometer, a variety of motions of the PDID 10 and send corresponding signals and/or alerts to the hub 70, including, for example, if an unused/unworn PDID 10 has fallen into the water. In some embodiments, all PDIDs 10 may be designed to float, but can use an embedded accelerometer to distinguish the limited bobbing movement of a floating PDID 10 from the motion characteristic of a swimmer with a submerged face, and so avoid creating a false drowning alert. In some embodiments, PDID 10 may even send a unique signal alert to the tower so that personnel monitoring system 1 are aware that an active PDID 10 may have been removed and/or fallen into the pool and needs to be addressed. Moreover, in embodiments where PDID 10 is secured via some elastic mechanism, e.g. headband, elastic strap, swim cap, PDID 10 may also include a "flex sensor," which is able to detect the slight difference between PDID 10 being open (i.e. being worn) and it being closed (i.e. no flex because it is not being worn).

As suggested above, some versions of PDID 10 may have an embedded submersion tracker, which may be equipped to one or more of the control circuitry 12 and/or signal generators 11, which enables the system 1 to automatically detect when a swimmer's face is fully submerged, as well as re-emerged, down to a split second. In some embodiments, "full submersion" may be defined as submersion beneath at least one inch of water, to ensure that all submersions are being detected and recorded, even when safe.

In some embodiments where PDID 10 is equipped with a RTLS sensor, PDID 10 may also include a vibration function that alerts the swimmer 20 if their direction is becoming skewed. For example, if the swimmer unknowingly begins to move to the left, a small but noticeable vibration may go off in only the left side of the PDID 10, to indicate to the swimmer that they need to go back to the right to stay on path. This swimming steering assist function may be deactivated for applications in which it is not appropriate, such as races in which it may be considered a disqualifying form of artificial assistance, and reactivated for other applications. In some embodiments, the vibration inclusion may also be used in any water setting as an indication to the swimmer when they have been submerged for a preset amount of time (e.g., 10 or 20 seconds) as a gentle reminder to come back up to the surface. If the swimmer does not react to the vibration alert, this may provide a secondary indication to the system 1 that there may be a drowning incident in progress and further action can be taken.

In some embodiments, PDID 10 may also include a perimeter sensor which functions similarly to an exit detector for products in a retail store. In some instances, users may forget they are wearing PDID 10. If a swimmer attempts to exit the pool or other designated water area while still wearing PDID 10, the perimeter sensors may send a minor alert signal to the hub 70 which may be customizable. To name a few non-limiting examples, upon detection by the perimeter sensors, the hub 70 and/or PDID 10 may emit a chirping noise, lifeguards may receive a minor alert signal unique to the perimeter sensor, the hub 70 and/or PDID 10 may emit a flashing light (such as via control circuitry 12), and/or the PDID 10 may vibrate to alert the swimmer that they have not removed PDID 10 before exiting the pool area. The perimeter sensor may also work in combination with an embedded RTLS-tracker so that swimmers who are simply taking a break from the water, or using the restrooms, may not send false perimeter alerts to the system 1. The hub 70 may also process combinations of signals from PDID 10 such as Bluetooth and RTLS signals to interpret whether or not to send a submersion alert. Additional aspects of the hub 70 processing signals from a PDID 10, potentially in combination with other data, are further described below with reference to the hub 70 and to auxiliary perimeter monitoring devices.

Non-limiting examples of other sensors that can be part of or otherwise equipped to the PDID 10 are the following: one or more thin flex sensors capable of detecting changes in the radius of the PDID 10 (alluded to above with respect to sensors to determine whether a PDID 10 is being worn properly); a contact/pressure sensor; a float sensor; a light emitting diode or LED which senses a certain state of the PDID 10 and generates a visible beacon; a battery sensor, monitoring the battery level of a PDID 10 to facilitate issuance of an appropriate maintenance warning such as "OK", "Low", or "Critical" (very low); a device that transmits light waves in the visible or infrared spectrum, and a corresponding device that receives the light waves; both devices attached to, or integrated in, the inner surface of the PDID 10 (directed towards the head of registered swimmer); and/or a device that transmits sound waves (e.g., ultrasound), and a corresponding device that receives sound waves; both devices attached to, or integrated in, the inner surface of the PDID 10 (directed towards the head of registered swimmer).

In the case of PDIDs 10 equipped with a pair of devices that transmits light and/or sound waves, when the PDID 10 is being worn properly, the wave(s) are blocked by the head of the registered swimmer. Light or sound waves may thus be used to ensure a swimmer 20 does not remove their assigned PDID 10 while swimming. When the waves are not blocked, the system registers the change in status of the registered PDID 10, and follows a protocol that may result in an alert or warning generated to a responder such as a lifeguard or parent that their swimmer is no longer being protected by PDID 10 and system 1. Similarly, when the pressure/contact sensor is not being worn properly (e.g., is off the head of the registered swimmer) or when the thin flex sensors indicate a change in the radius of the PDID 10, a responder receives an alert.

In certain embodiments in which the PDID 10 floats, the PDID 10 may be equipped with one or more of a light or siren that is activated (e.g., emits flashing light and/or an audible tone) when the PDID 10 is not being worn properly.

In certain embodiments, the PDID 10 may be equipped with one or more devices capable of detecting motion of the swimmer 20. Non-limiting examples of devices capable of detecting motion include accelerometers and gyroscopes. The motion sensors can be used to record metrics of performance by the associated swimmer 20, including distance covered, lengths, average pace, and duration.

As discussed above, in some embodiments, the PDID 10 may include one or more fixed, rechargeable batteries, supporting up to 16 months of 8 hour/day estimated use. In some embodiments, all components of system 1, including each PDID 10, may be recharged using renewable energy in the form of solar panels. In some embodiments, solar panels may be added as an accessory to system 1, and may also come in a portable form in order to move the panels with the system 1 as necessary. In some embodiments, the hub 70 and PDIDs 10 may be configured for wireless or contactless recharging, such as via magnetic induction or radio waves.

In some embodiments, each PDID 10 may also include an LED lamp or beacon, reflective decal, or other visible device to more easily locate the swimmer 20 once submerged. Such visible devices may improve locating a submerged swimmer in low-visibility conditions, such as where the water is particularly turbid and/or the bottom surface is of a low-contrast color, similar to the swimmer, as may be encountered in lake or ocean swimming conditions. In some embodiments, the PDID 10 may also alert lifeguards when a swimmer 20 is approaching or has passed any assigned boundaries (e.g. no-swim zone, out of bounds, an inexperienced swimmer leaving a shallow region into deeper water) so that they may be quickly directed back into the designated safe area.

In some examples, system 1 may include a hub 70 that may wirelessly connect with, send signals to, and/or receive signals from, the PDIDs 10 and lifeguard wearables 60 (described below). In various examples, the hub 70 may be described as a sensor hub, data hub, tower hub, or other similar names. In some embodiments, the hub 70 may be mounted or otherwise positioned on top of a tower 80, described below with reference to FIG. 8.

In some examples, a hub 70 of the system 1 may receive wireless signals from each associated PDID 10, and detect and track unique identification codes from the wireless signals from the PDIDs 10, as discussed above. The hub 70 may store information on pairs of unique identification codes, where each pair of unique identification codes is registered to a given PDID 10. In some examples, if the hub 70 detects that both wireless signals from a single PDID 10, as identified by their unique identifying codes, are no longer detected, the hub 70 begins tracking a length of time that that pair of signals (one from each signal generator 11), corresponding to a given PDID 10, remains undetected. If the hub 70 tracks that that pair of signals remains undetected for a selected period of time (e.g., 30 seconds, on a general default setting), the hub 70 responds by outputting an alert signal, which the wearables 60 are configured to detect and to be prompted to respond by outputting an alert and/or other information.

In some embodiments, the alert may include the last known location of the swimmer 20 who triggered the alert. For example, determining a swimmer location can be accomplished using comparison of radio signals from the swimmer's 20 PDID 10 to determine approximate real-time location (RTL). By determining the RTL, in the case of an alert or warning, an audible, visual and/or other signal may be emitted by a device such as a hub 70 or strobe/siren device 90 near or nearest the last known location of the swimmer 20 causing the alert. Further, the last known RTL of the swimmer in distress can be depicted as a graphic on a screen, e.g., a tablet 100 or a smartphone, or indicated by a feature in the water, such as a battery/solar powered wireless buoy in the water, e.g., the buoy(s) closest to the swimmer would begin flashing an on board LED. In such embodiments, the buoy may implement the functionality of a hub 70, or may act as a separate strobe/siren device 90 (discussed below).

An example hub 70 may be implemented to include a controller, a signal receiving system such as a Bluetooth transceiver/relay system, and other communications components such as a WiFi router, a cellular modem and transceiver, and/or a satellite transceiver system. The controller may be implemented with a Raspberry Pi computer, for example. In some examples, the controller may be implemented with a Real-Time Operating System (RTOS) such as VxWorks® available from Wind River® Systems of Alameda, Calif., to help ensure performance characteristics such as powerfully maximized or strictly uninterrupted uptime, to help prevent any possible lapses in safety monitoring. Other embodiments of hub 70 may be implemented using any suitable electronics and/or software combination.

In some examples, the hub 70 may take other signals, signal characteristics, or information into account in determining whether to output an alert signal. For example, the hub 70 may track whether the signal strengths of the pair of wireless signals encoding the pair of unique identifying codes for a given PDID 10 are lost suddenly, or whether they decline slowly and regularly over time. Sudden loss of the signal strengths of both wireless signals from a given PDID 10 may be likely to correlate with submersion of the PDID 10, and thus, the swimmer 20, in water, while slow, gradual loss of signal strengths over time may be likely to correlate with a wearer who is wandering away from a pool. The hub 70 may thus, within nominal tolerances to ensure prevention of false negatives, screen for sudden signal strength loss as a prerequisite condition for determining to transmit an alert signal, and refrain from initiating an alert signal if it determines that the signal strengths both decay slowly and smoothly.

The hub 70 of system 1 may also perform location tracking using other location tracking techniques, such as machine learning-enabled object recognition and tracking via connected video cameras; Bluetooth signal origin triangulation of the signal generator 11 transmissions to at least three, spaced-apart Bluetooth receiving units connected to the hub 70 of system 1; Ultra Wide Band (UWB) or other RTLS location tracking; and/or a combination of either of the above with GPS and/or each other or other location tracking technique. Another possible triangulation technique may use multiple hubs 70 configured to system 1 that form a mesh network, where the multiple hubs 70 can each contribute necessary information to triangulate a given PDID 10.

In some embodiments, the real-time location trackers, which may be embedded in a PDID 10 as discussed above, may be used in combination with a screen which displays a map of the area and updates each swimmer's 20 real-time location as they move through the water. In the event of a drowning incident, the signal sent to a lifeguard wearable 60 may include a submersion alert alongside the precise position where the swimmer 20 last went underwater in order to enable them to be located them as quickly as possible.

Figure 8:
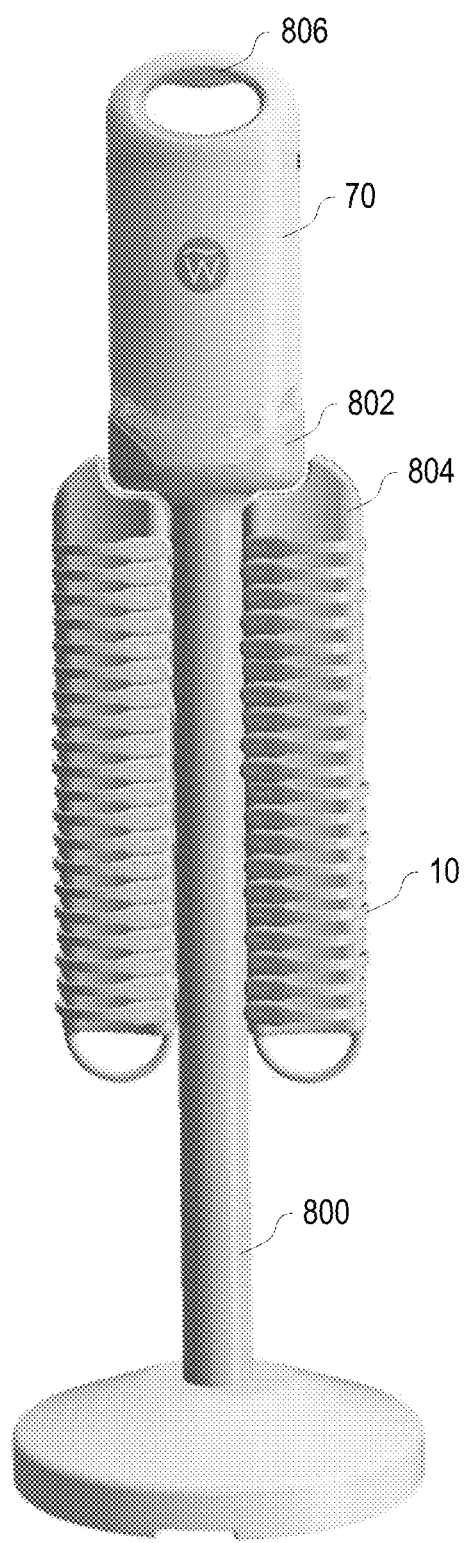
FIG. 8 illustrates an example hub for receiving signals from a PDID and potentially providing alerts, along with a supporting tower and rack for storing PDIDs, according to various embodiments.

Referring to FIG. 8, positioning a hub 70 on top of a tower 800 may place the hub 70 at a significant height above a floor or other surface, which may enhance the hub's 70 signal reception to receive and send signals across a broad aquatic activity area. The tower 800 may include a specialized hub mounting cradle 802 at an upper portion thereof. The cradle 802 and the hub 70 may be shaped such that the hub 70 may be clicked into or otherwise easily securely positioned into the cradle 802. The tower 800 may also include racks 804 designed to hold columns or rows of PDIDs 10, such as headsets, that are ready for swimmers to simply pick up from the racks 804 to put onto their heads. The tower 800 may include integrated charging components to recharge the PDIDs 10, such as when the PDIDs 10 are in place on the racks 804. The integrated charging components may be implemented in any suitable fashion, e.g. via wireless charging, such as via induction, or via physical connection.

The tower 800 may also be integrated electronically with the hub 70 for purposes of detecting when PDIDs 10 are removed from the racks 804, for the hub 70 to register or check out and begin monitoring. Similarly, in some embodiments, replacing a PDID 10 upon a rack 804 may send a signal to hub 70 to discontinue monitoring and/or to PDID 10 to deactivate. In some embodiments, as seen in FIG. 8, this hub 70 may be implemented in the form of a portable, lightweight, and visually sleek device. The hub 70 may include a handle 806 on a top thereof to facilitate carrying and handling by unassisted human users.

In a non-limiting example, the technology from the hub 70 may be implemented into buoys specifically designed for this purpose in open water settings, so that they may function both as a discernable perimeter boundary and to ensure that there is always a hub 70 close by to receive signals with high signal strength from the PDIDs 10. In some open water settings, swimmers can become disoriented in their direction without obvious boundaries to follow.

In some examples, the hub 70 may monitor signals from the PDIDs 10 without pairing with or otherwise transmitting any signals to the PDIDs 10, specifically, where each PDID 10 is equipped with one or more signal generators 11 implemented as BLE beacons, discussed above. This may enable operation with low power use and simplicity of operation in comparison with, e.g., pairing with the headset via Bluetooth pairing. The signal generators 11 of a PDID 10 may comprise Bluetooth transmitters, which may transmit low-energy Bluetooth advertising signals at a frequent rate, e.g., once per second, and submersion of any single Bluetooth transmitter under a small depth of water, e.g. one inch of water, may suffice to obscure most or all of the signal strength of that transmitter. The hub 70 may thus accurately track whether each of the Bluetooth transmitters is non-negligibly submerged in water at an effective frequency of one Hertz. The hub 70 may send signals such as alerts to other devices or systems, such as lifeguard wearables 60 and/or a control tablet 100, as described further below. Hub 70 may also serve as a data collection point, where all received signals are sent to another device for collection, storage, and ultimately, analysis (discussed in more detail below).

Referring back to FIG. 1, this functionality may be seen. The strength of the wireless signals being emitted from the signal generators 11 of PDIDs 10a, 10b, 10c and 10d is shown by a Wi-Fi icon, e.g., a triangular wedge with four (4) rounded bands. In the embodiment of the PDID 10 having two signal generators 11, for swimmers 20a, 20b and 20c, at least one signal generator 11 is disposed above the waterline, thereby enabling a wireless signal to travel to the hub 70 unimpeded. The signal generators 11 on the PDID 10d worn by registered swimmer 20d are being blocked. This is illustrated by the cross-out ("X") through the Wi-Fi icon. So long as the signal generators 11 on the PDID 10d worn by registered swimmer 20d (a headband that wraps around the back of the swimmer's head) do not remain submerged for at least 15 seconds, an alert is not sent. However, if the signal generators 11 attached to the PDID 10d being worn by registered swimmer 20d remain submerged for at least 15 seconds, an alert is sent.

With a hub 70 and tower 800 with racks 804 for holding PDIDs 10 in this manner, the system 1 may become essentially "self-serve," as incoming swimmers can simply take an available PDID 10 before they enter the pool, and the system 1 may update the monitoring information for PDID 10s that have been taken for use, for any on-duty lifeguards. In an example embodiment, the tower 800 can house up to 50 PDIDs 10 at a time. In some embodiments, the tower 800 is specifically designed so that air can continuously flow between the PDIDs 10, allowing them to dry quickly and efficiently between swimmer use.

In some embodiments, the tower 800 may also function as a recharging station for swimmer or lifeguard wearables 60 that are not in use, either through a connectable charging port or as a wireless charging unit, such as an electromagnetic induction wireless charging unit, where wearables 60 only have to be placed on top of or adjacent a wireless charging unit in order to begin recharging. The tower may include racks 804 with integrated wireless charging units such that if a user merely places a PDID 10 in an intuitively proper position in the racks 804, the PDID 10 is properly positioned in relation to an adjacent wireless charging unit integrated into the rack 804, and the wireless charging unit automatically begins recharging an internal battery or battery pack inside the PDID 10. A processing unit of the PDID 10 and/or of the tower 800 or hub 70 may also detect and manage the recharging process. In some embodiments, the processing unit of or in control of the PDID 10 may be located in a locally located hub 70 or in a cloud hub platform, and be operably in control of PDID 10 functions via high-frequency, low-latency communication with the PDID 10 components.

In some embodiments, a locally located hub 70 may act as a thin relay with a cloud hub platform executing on a cloud service. The local hub 70 may relay the PDID 10 signals to the cloud hub application. The hub's 70 functions of monitoring the PDID 10 signals to perform submersion detection and generating alert signal outputs directed to the lifeguard devices 60 may be performed by the cloud hub application, while the local hub 70 implements failover performance of all hub 70 functions if latency from the cloud hub application rises above a low threshold of unacceptable performance.

In some embodiments, the hub 70 may contain a circular or other shaped array of antennae in order to extend the signal range to a 1000 feet radius or higher. In embodiments where the radius needs to be much larger than 1,000 feet, such as in an open water setting, multiple hubs 70 can be set up around a perimeter and communicatively (e.g., wirelessly) connected with each other to share received alerts and signals. In this embodiment, one hub 70 may serve as a primary control center in charge of sending signals to and receiving signals from the other hubs 70, including signals the hubs 70 receive from tracked swimmer wearables within their respective ranges. In one example, due to an enormous 1,000 foot communication range of each hub 70, each hub 70 of this embodiment may be able to successfully track and monitor up to thousands of swimmers 20 (with thousands of signal generators 11, both left and right beacons of each swimmer PDID 10) at the same time, supporting safety for all of a large number of swimmers 20 or other aquatic activity participants who are all enjoying the same space.

In some embodiments, in addition to sending corresponding real-time alerts to lifeguard wearables 60 based on the signals received from PDIDs 10, the hub 70 may also include customizable and optional alerts as well, for example, but not limited to, an embedded flashing strobe light and an adjustable selection of audio alerts and volumes, based on the users' needs or preferences. For example, a hub 70 may send alert signals to lifeguard wearables 60 and/or other monitor systems for audio alerts that are encoded with information, e.g., about a location of a detected potential drowning incident and/or a swimming expertise level of a swimmer registered with a PDID 10 involved in the detected potential drowning incident, such that the audio alerts may be interpreted and understood by lifeguards due to training thereon, but are subtle and do not alarm or panic other guests of the pool. Additionally, the hub 70 may be designed to be both weatherproof and waterproof to ensure that there is no risk during drastic weather changes, or if the hub 70 is accidentally knocked into the water.

In some embodiments, the hub 70 and/or tower 800 may have a fixed, rechargeable battery with up to around 22 hours of daily use before a recharge is necessary. In some embodiments, it may take 6 hours or less to fully recharge the hub 70. In some embodiments, some or all components of the system 1, including the hub 70 and tower 800, may include solar panels, or otherwise be recharged using renewable energy from solar panels or other renewable energy sources. In some embodiments, the hub 70 may be charged by placing it on a charging dock or by connecting an AC power cord. The tower cradle 802 may include power integration for the hub, which may include a wired or inductive wireless charging dock, AC mains power connection, a solar power or other renewable power connection, and/or any combination of the above, and may automatically charge the hub 70 when the hub 70 is properly placed into the cradle 802.

In a non-limiting example, a residential consumer may purchase a scaled-down version of system 1, and download a corresponding app which connects their system directly to a previously installed smart home system. As with versions of system 1 intended for commercial/public aquatic facilities, the scaled-down system 1 may include wearable PDIDs 10 for swimmers, as well as monitor/alert devices, namely lifeguard wearables 60 (e.g., in a bracelet or other wearable form factor) for the supervising adult(s). However, in lieu of a dedicated unit to implement hub 70, a scaled-down version of system 1 may be able to rely on the smart home system to support a software application implementing functionality for system control (typically provided via a server 80 and/or control tablet 100) and hub 70. Thus, hub 70 is implemented in software via the smart home system. The software application may interact with or otherwise be executed in whole or in part by the smart home system to configure the smart home system to detect signals from the PDIDs 10. The smart home system would then share the detected PDID 10 signals with the hub software application executing in communication with the smart home system. The smart home system would further, under the direction of the software application, output alerts audibly or send alert signals to the monitor/alert devices, as in the examples described above. Examples of smart home systems may include, e.g., Google Home, Amazon's Alexa, or Apple's HomePod/HomeKit, to name a few.

In a system 1 with smart home system interoperability such as this, a user may simply ask the smart home system to turn on the system 1, e.g. by launching the application discussed above, and the system 1 may perform any of a variety of analogous functions as in a public swimming setting, or as described above with reference to the hub 70 and tower 800 subsystem of the system 1, taking on the role of hub 70. In various examples of a scaled down system, a hub subsystem may be implemented in whole or in part in a dedicated hub 70 with the smart home system providing additional alert and/or control functionality, completely on a smart home system as described above, or on a home computer, smart phone, or smart personal device in communicative connection with a smart home system. Essentially any networked device capable of executing an application implementing the functionality of hub 70 may be configured to provide the hub functionality of system 1. In some examples, the system 1 may also include a mobile app implementation of a monitor/alert component, to provide the alert functionality of a lifeguard wearable 60. For example, in some such embodiments the smart phone or smart personal device can provide similar functionality to a lifeguard wearable 60, possibly in connection with an application running on the smart phone or device. In some embodiments, a system 1 may also integrate with or include one or more cameras through which the system 1 may monitor a pool or aquatic activity area during off hours. If the system 1 detects someone entering the pool area or aquatic activity area during off hours, it may send an intrusion alert, e.g. through the smart home system, and thereby help avert an unmonitored swimmer situation.

In some embodiments of system 1, lifeguards or other designated adult supervisors are also equipped with monitor or lifeguard wearables 60 that have a communicative connection with the hub 70 to receive a range of alerts based on swimmer activity in the water. These lifeguard wearable 60 components may also be referred to as monitor wearables, lifeguard bracelets, bracelet devices, or with other analogous names, with the understanding that they may refer interchangeably to any implementation of a variety of related potential embodiments of a lifeguard wearable 60. When the wireless signals from the signal generators 11 on the PDID 10 are blocked, resulting in a potential drowning incident, an alert is sent, e.g. from the hub 70, to the responder 50 (typically a lifeguard or other supervisory person) who may be in possession of an associated wearable 60. The alert may also be sent to a non-responder, such as a parent or caregiver. The alert may be sent from the initiating device, such as hub 70, to the lifeguard wearable 60 and/or other alerting device via a suitable communications link. In some embodiments, hub 70 and wearable 60 may communicate directly via a wireless link, utilizing a suitable technology, e.g. WiFi, Bluetooth, etc. In other embodiments, hub 70 may communicate the alert to wearable 60 via one or more intermediate nodes, such as a server 80, which may be located proximate or remote from the hub 70. In some embodiments, the server 80 may be responsible for initiating the alert, in response to data provided from hub 70.

System 1 was created to work in partnership with the current training and protocols that lifeguards are already being taught as an assistant, not as a replacement system for active lifeguards. In some embodiments, the lifeguard wearable 60, worn by responder 50 (typically a lifeguard or other person trained in aquatic safety) is able to receive and distinguish a variety of alerts, from minor (such as a perimeter sensor alert or shift rotation alert), to serious (in the case of a potential drowning incident). In some embodiments, the lifeguard wearable 60 is implemented as a bracelet, wristband, or similar in a similar form factor, and may weigh 2 ounces or less and provide a secure and comfortable fit. Alerts may come in the form of vibrations, varying from light to strong, varying by length of vibration, and/or varying by pattern of vibrations, in order to distinguish different types of alerts coming through. Vibration alerts may be ideal for noisy environments like a busy pool area, where audible alerts may not be heard, but the customizable nature of system 1 allows for all types of alerts, including, but not limited to, vibrations, audible alert tones, or visual alerts, such as a flashing light or series of lights. In some examples, wearable 60 may produce simultaneous alerts that include vibrations, visual alerts, and/or audible alert tones. The particular alert or alerts issued by a given lifeguard wearable 60 will depend upon how wearable 60 is implemented.

In some embodiments, the responder 50 may also be able to control the alerts, such as by turning them off when it is confirmed that a potential drowning incident has been resolved or is a false alarm, or if a perimeter breach has been addressed. Additionally, the system 1 can be set so that the alerts come through in the most organized way for an implementing facility. In a non-limiting example, a facility may wish for a first submersion alert to be sent via vibration to the one, two, or other number of responders 50 who are closest to the swimmer in need, followed by an additional alert sent to the remaining responders 50 if, after a selected period of time, such as 10 seconds, for example, the alert has not been turned off (e.g., by a responder 50 confirming there is not a drowning incident in action, by the hub 70 or the swimmer's PDID 10 sensing that the swimmer is now back above the surface, or by biosensors sensing normal readings for the swimmer 20 in question). Wearables 60 could also be used to assist responders 50, such as lifeguards, in timing their scanning protocols, to assist in rotation shifts with other guards.

Other embodiments of the system 1 may include providing wearables 60 for non-swimmers other than a typical responder 50 as a lifeguard, e.g. parents, administrative staff, managers, non-swimming children, spectators, etc. In some such examples, the wearable 60 may be equipped with a transceiver. The system 1 may be configured to detect if the wearer enters the water (signal is blocked by water) and alert a responder 50, such as a lifeguard, of the entry of a non-swimmer into a swimming area or a pool. As with lifeguard-worn wearables 60, the wearable 60 provided to a non-swimmer can be provided to non-swimmers as other suitable form factors, such as a clip-on clothing unit, an earpiece, a unit worn on a lanyard, embedded into a guard whistle housing, embedded into eyeglass and sunglass frames, and others.

In one embodiment, the wearable 60 is a waterproof wireless battery powered bracelet that will vibrate and/or flash an LED and/or sound a tone and/or provide other additional information, such as location, when there is an alert. In other embodiments, lifeguard wearable 60 may be implemented in other suitable form factors, e.g., a headband, earphones or muffs, pendant on a lanyard, integrated into sunglasses, a clip-on device similar to a pager, or as an application executable on a mobile device such as a smartphone or tablet. In some implementations, multiple different form factors for wearable 60 may be available to suit a given responder's 50 preferences and/or to accommodate any unique aspects of a given aquatic facility that may make some form factors for wearable 60 more preferable over others. It should be understood that a given wearable 60 may vary in the types of alerts it can offer, even within a single implementation of a system 1. For example, some wearables 60 may provide both visual and vibratory alerts, while others may provide auditory and vibratory alerts, while still others may provide only vibratory alerts.

Figure 9:
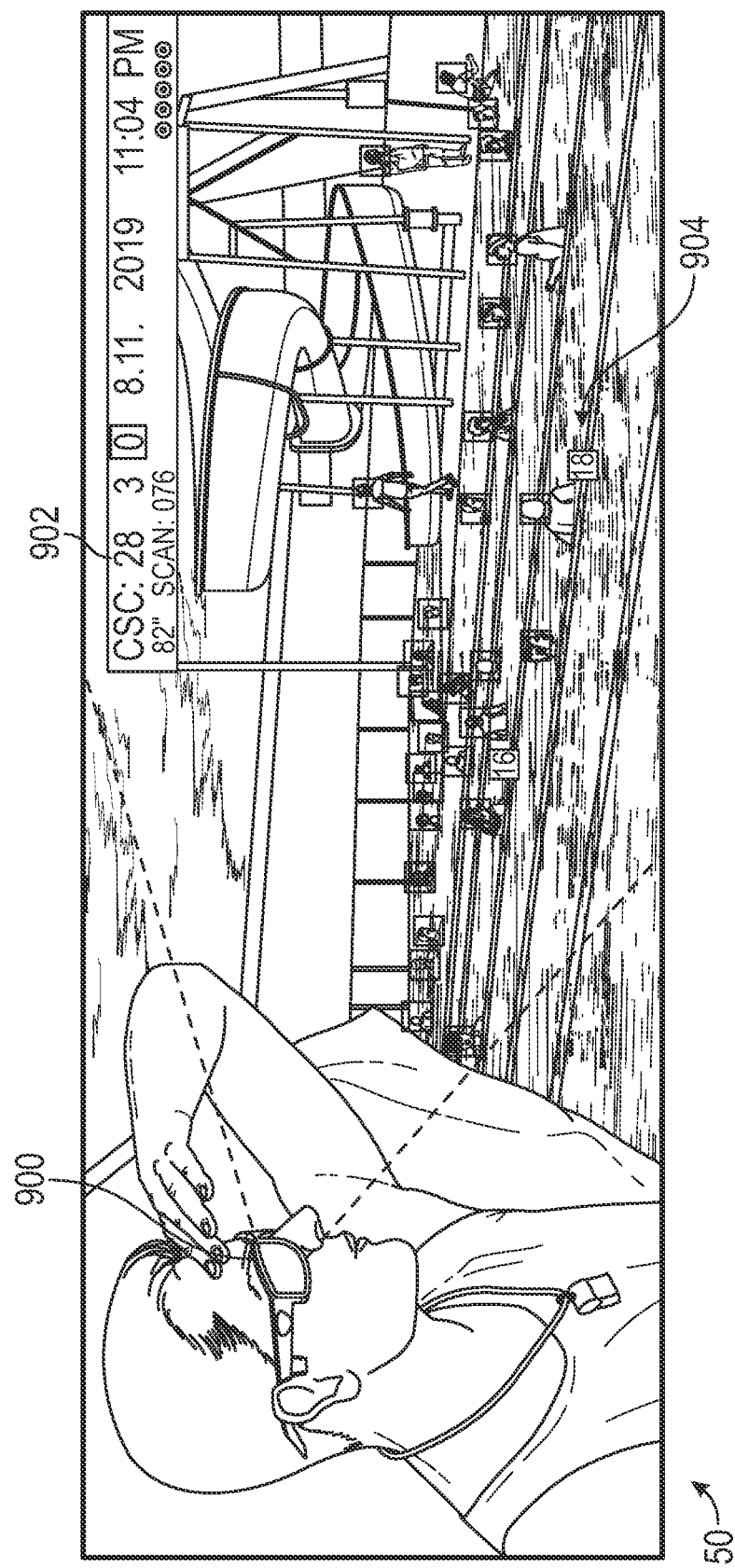
FIG. 9 illustrates a possible view from an example augmented reality (AR) device worn by a responder such as a lifeguard, according to various embodiments.

In some embodiments, the lifeguard wearables 60 may include or be implemented as augmented reality (AR) glasses 900, connected to hub 70 or a server 80, that display swimmer and alert information directly over the responders' visual of the water area. An example of such a possible display is depicted in FIG. 9. Display information may include, but is not limited to: a real-time swimmer count 902 based on how many PDIDs are active; a ratio of beginner or young swimmers to experienced swimmers or adults; a real-time count of seconds submersed in water displayed above each swimmer (possibly with the addition of color coding in a box approximating the position of each swimmer, as shown, to indicate level of risk as the seconds grow higher, e.g., yellow for approaching a preselected amount of submersion time for an alert, and red after the preselected amount of submersion time has been passed); and accurate and highly visible depictions 904 of swimmers under the water based on real-time location tracking (in particular in open/natural water settings due to the low visibility under the surface), among other potential modes of presenting information.

In some embodiments, the AR glasses 900 may be paired with the system 1, such as hub 70 and/or server 80, in order to ensure that all relevant information being obtained is given to responders 50 as needed. In some embodiments, a lifeguard wearable 60 may be implemented as or otherwise include AR glasses 900, and also include an additional audio earbud or headphone piece attached to or otherwise in communication with the AR glasses 900. The earbud or headphone goes in or on, or is proximate to, at least one of a wearer's ears to receive additional audio signals and alerts. In some embodiments, the AR glasses 900 can be either in the form of standard glasses or sunglasses, depending on the location. In some embodiments, the AR glasses 900 are also waterproof to ensure there are no issues if they either fall into the pool, or if the responder 50 enters the water to help a swimmer before removing the glasses 900. In any of various embodiments of lifeguard wearables 60, however, the wearables 60 may be designed to integrate seamlessly into and enhance well-established lifeguarding practices and protocols, rather than disrupting or distracting from ordinary and proper lifeguarding practices.

In some embodiments, lifeguard wearables 60 may have a fixed, rechargeable battery with up to 18 hours, for example, of continued use before a recharge is necessary. In some embodiments, all components of the system 1, including the swimmer wearables, may be recharged using renewable energy in the form of solar panels. In some examples, the PDIDs 10 and/or lifeguard wearables 60 may be designed for a nominal usage lifetime of around twelve to eighteen months. For example, the battery capacity of any type of battery invariably declines at least somewhat over time, the length of which will vary depending upon a variety of factors, such as charging cycles, depth of discharge, speed of discharge, speed of charging, environmental conditions, overheating, etc. Other internal components of the PDIDs 10 and/or lifeguard wearables 60 may also have finite nominal usage lifetimes, especially given expected usage of the PDIDs 10/wearables 60 in likely chemically treated aquatic environments for substantial blocks of time on a daily or otherwise frequent basis. The system 1 may be configured to provide prompts to management personnel in charge of managing the system 1 to order a new set of replacement PDIDs 10 and/or wearables 60 on a regular schedule, such as once per year. The system 1 may prompt for replacement of the lifeguard wearables 60 either on the same or an independent schedule as that for the PDIDs 10. Annual or otherwise periodic replacement of PDIDs 10/wearables 60 may also enable users to enjoy new versions of PDIDs 10/wearables 60 incorporating new upgrades and technological improvements in battery life, energy efficiency, transmission range, signaling accuracy, and other compelling engineering performance criteria over time.

In other examples, lifeguard wearables 60 may also incorporate at least some functions as ascribed to the hub 70 above, and may directly receive, monitor, and react to signals from the signal generators 11 of PDIDs 10. In such embodiments, a lifeguard wearable 60 may act at least partially as a hub 70, independently receiving and monitoring signals. In some examples, the lifeguard wearables 60 may also transmit some or all available data they receive to one or more locally placed hubs 70 and/or to a cloud-based hub control implementation application (e.g., via cellular connection or WiFi). In some examples, some or all of the hubs 70, lifeguard wearables 60, and/or PDIDs 10 may all act as signal monitoring relays with each other, and some or all of the local hubs 70 and lifeguard wearables 60 may communicate with a cloud-based hub control implementation application, to implement an intelligent division of labor among their functions while maximizing the possible signal receptivity of the entire system 1. Still further, and as suggested by the foregoing, a wearable 60 may provide a trackable location, either by transmitting RTLS (similar to a PDID 10), by radio location relative to a hub 70, or another suitable technique for tracking the location of a given wearable 60.

In some embodiments, the system 1 may also include a connected control tablet 100 with a touch-screen interface where the entire system may be easily and efficiently managed. In some embodiments, the tablet 100 is easy to install when working as a permanent fixture, or portable during a temporary use. In some embodiments, in partnership with location tracking, the tablet 100 can be used for real-time assistance when a submersion alert has been sent through the system 1, and the tablet 100 may display a last known location of the possibly distressed swimmer 20 on the screen. In a non-limiting example, the display may also utilize distinctive, bright colors in order to make the information as easy as possible for lifeguards to understand quickly for immediate response. In some embodiments, when other alerts or signals are received by the hub 70 from either PDIDs 10 or lifeguard wearables 60, the tablet 100 may be programmed to display written or coded versions of the alerts as an additional informational center. Additionally, when there are no specific alerts or signals to receive or decode, the control tablet 100 may display simple statistics based on current swimmer activity, such as, but not limited to, the number of active swimmers, the number of on-duty lifeguards and active lifeguard wearables, and/or data from the previous day or hour as may be needed for comparison or preparation, for example. As will be recognized, the data presented on a tablet 100 may correspond or otherwise be similar or identical to data presented to a responder 50 via AR glasses 900.

In another embodiment, the control tablet 100 may also serve as the primary management interface for the system 1 as a whole, where customizable or optional settings can be set, changed, or updated as other factors may change through the days or seasons. These settings may include, but are not limited to, the amount of submersion time of a PDID 10 before an alert is sent, potentially including different submersion times for different classes of swimmers; how the various alerts from PDIDs 10 are translated to alerts for the lifeguard wearables 60; which, if any, alerts the hub 70 may emit during a submersion or other incident, including the type of audio or volume on audio-based alerts, to name a few examples. In some embodiments, the tablet 100 may also serve as a connection point if the user is interested in viewing previously captured and/or analyzed data, discussed below. In this embodiment, the tablet 100 and/or hub 70 may also be connected to a cloud service in order to utilize more storage space for collected data without potentially using up all of the data storage capacity of the tablet 100. Tablet 100 may be implemented as a dedicated hardware component, specific to system 1, as a software application that may be executed on a generic tablet (e.g. an iPad from Apple or a Surface Windows device from Microsoft), or a combination or hybrid of dedicated hardware and software. In other embodiments, tablet 100 may be implemented as a laptop, desktop, mobile device such as a smartphone, or another suitable computing device; "tablet" is not intended to be limiting for form factor.

As noted above, various embodiments of the system 1 may include auxiliary components and devices for monitoring open water applications and aquatic activity area perimeters. For example, alerts may be augmented via a strobe/siren device 90, which can provide alerting to various locations/personnel that may not be in visible line of sight of a hub 70, and may not feasibly be equipped with a wearable 60, e.g. a back office, maintenance room, restroom, locker room, break room, etc. The strobe/siren device 90 may be connected to other components of system 1, e.g. hub 70 or server 80, via a wired or wireless communications link, similar to those discussed above.

Server 80, depending upon the embodiment, may act as a central aggregating device, to coordinate operation of the various hubs 70. In some implementations, one or more hubs 70 may be deployed at a facility, which may communicate to a server 80, located either on site or remotely, such as a cloud service. The server 80 may perform a variety of functions, including data collection from each of the hubs 70, to allow for analysis of swimmer activity (discussed below), and/or coordination and issuance of alerts. In some embodiments, the functionality and/or physical equipment of server 80 may be integrated into hub 70, which thus will act as both a hub and server 80. In other embodiments, hub 70 may simply act as a central data collection point and alert device, with the processing of data to detect a potential drowning incident, coordination of alerts to PDIDs 10, wearables 60 and/or strobe/siren devices 90, and tracking of swimmer location carried out in part or in whole by server 80. Thus, server 80 may allow for hubs 70 to be implemented using comparatively simple hardware, effectively acting as simple relays of information to server 80. Server 80 may be implemented using dedicated hardware, software running on a generic or commercially available computing platform (e.g. Mac, Windows server, etc.), or a combination of both.

Various embodiments of system 1 may utilize various wireless technologies to serve different purposes to enable real time tracking of swimmers 20. For example, at open water swim events, swimmers 20 are often in natural water that is far out from the shoreline or away from support boats. This type of environment may be very challenging in which to ensure the safety of swimmers 20. Detecting if an open water swimmer 20 might be in distress is paramount, while it is equally important to make rescue teams aware that that swimmer 20 is in distress. In addition, while GPS is capable of tracking the geolocation of the swimmer 20, that location must be transmitted to the shoreline or to support boats if rescuers are to find the swimmer in a safe period of time.

Figure 6:
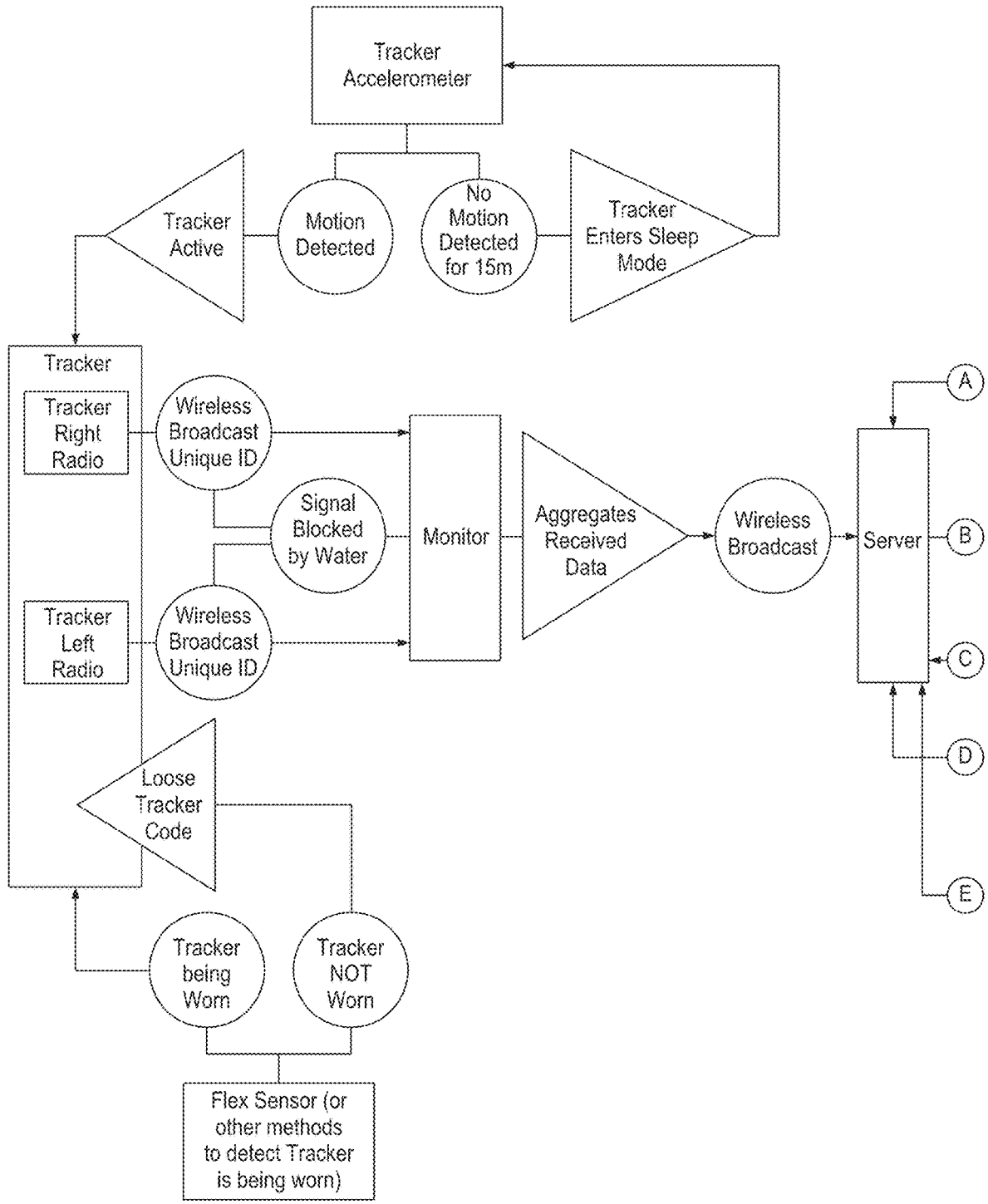
FIG. 6 illustrates a flow chart for the processing of wireless signals and sending of alerts that may be employed by a PDID system, according to various embodiments.
Figure 6:
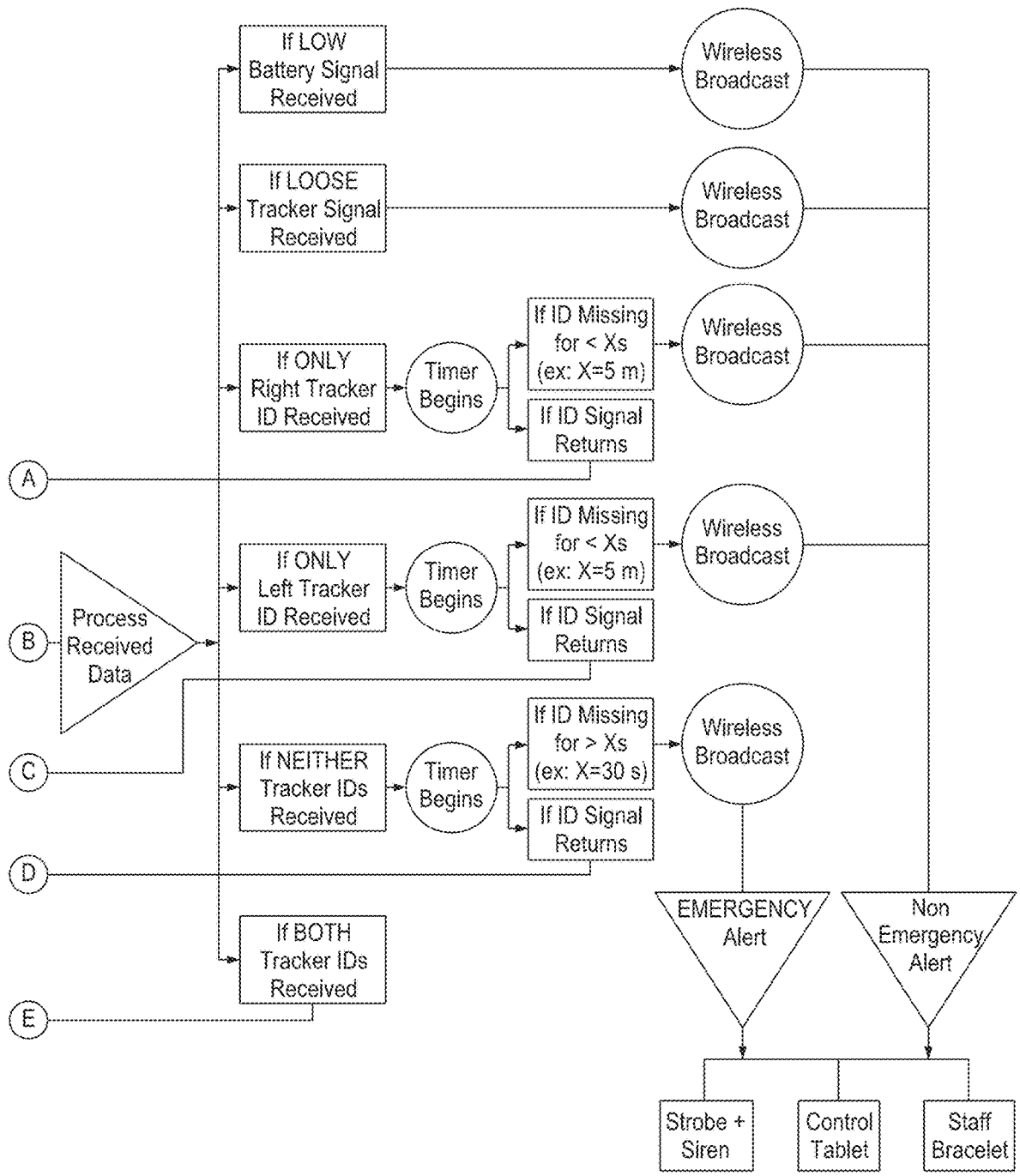

FIG. 6 represents a flow chart for the processing of wireless signals and sending of alerts. Warnings are referred to in FIG. 6 as non-emergency alerts. The flow chart of FIG. 6 may be implemented by system 1 in whole or in part. Further, the flow chart of FIG. 6 may be implemented primarily by one or more hubs 70, and/or on a server 80.

It is common practice in large swimming facilities to have multiple lifeguards monitoring a large swimming area, with each lifeguard assigned to a specific zone such that all separate and contiguous swimming areas are monitored. In certain preferred embodiments, the system 1 is configured to monitor these different swimming zones within a pool facility, and route alerts and warnings to the individual lifeguards that are assigned to monitor those zones. By way of example, lifeguards may be assigned to different swimming zones within a pool facility, such as a toddler play area, a shallow swimming area, a transition area, a deep water area, or a "no swimming allowed" zone. Based on the type of swimming zone, the system 1 may have different pre-set limits related to the generation of alerts and warning, based on the typical swimming ability of individuals within each zone.

In some embodiments, swimmers 20 may be assigned a PDID 10 of different size or color based on their level of swimming skill. Each PDID 10 may be assigned for use in all swimming areas, or only in certain swimming areas. The system 1 can then present an out-of-bounds warning to a lifeguard assigned to the zone when a PDID 10 is taken from its assigned swimming area. As discussed above, the warning may also be sent to a non-responder, such as a parent or caregiver. In some embodiments, non-swimming areas may also be assigned zones, and monitored by system 1. In so doing, the system 1 can track the presence of swimmers (provided they wear a PDID 10) within the swimming facility while they are in swimming zones as well as non-swimming zones. By utilizing the real-time data associated with the movements of swimmers across these zones, the system 1 is capable of distinguishing a potential drowning incident from the absence of a swimmer within a swimming zone because the swimmer walked into a non-swimming zone, such as a pool-deck seating area or a bathroom facility, thereby avoiding a false drowning detection alerts or warnings which might inappropriately distract a lifeguard.

In some embodiments, the secured entrance of the swimming facility may be assigned the status of a non-swimming zone. By tracking the presence of PDIDs 10 within this zone, the system 1 can alert an attendant at the facility that a patron is leaving with one of the facility's PDIDs 10. This "walk away alert" can also be configured to distinguish between a PDID 10 whose ownership is registered to the facility, from a PDID 10 that is registered to an individual swimmer. By tracking PDID 10 ownership, the facility can receive a "walk away alert" only when a patron is leaving with the facility's PDID 10, thereby addressing PDID 10 inventory shrinkage.

Figure 10:
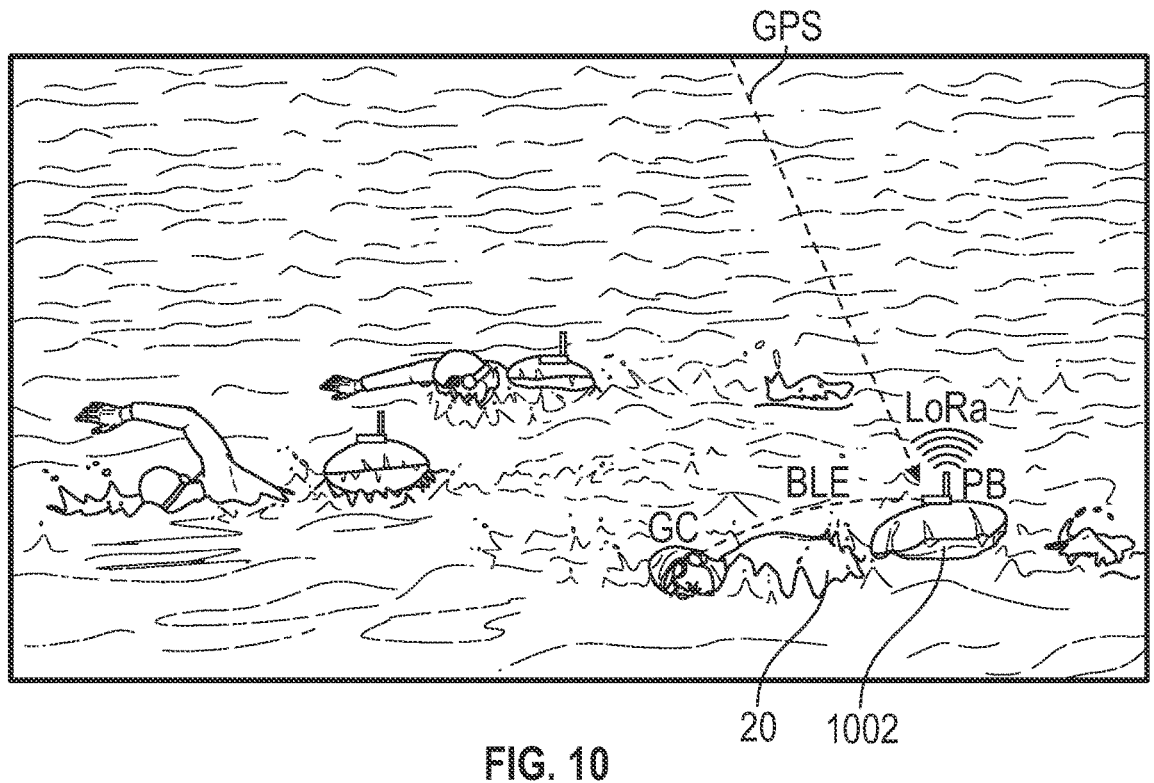
FIG. 10 illustrates an example floating transceiver that may be equipped to a swimmer, such as in open water settings, according to various embodiments.
Figure 11:
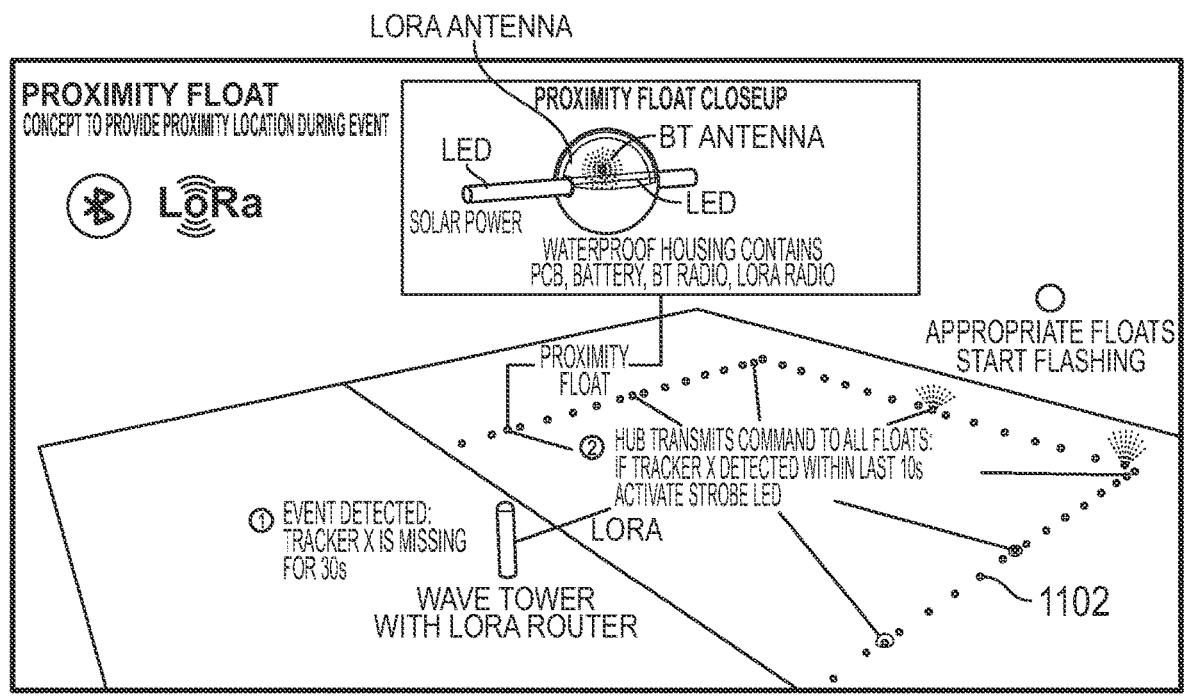
FIG. 11 illustrates an example proximity float or beacon to detect and alert the presence and location of a swimmer potentially travelling out of bounds or experiencing a potential drowning, according to various embodiments.

Referring to FIG. 10, various embodiments of system 10 may be used to address issues surrounding open water aquatic activities. In some embodiments, system 1 includes a floating transceiver 1002. The floating transceiver 1002 may be attached to a swimmer's 20 body directly or via a cable or line (not depicted) in tow behind the swimmer 20. Where the floating transceiver 1002 is tethered to swimmer 20 via a cable or line, the cable or line may be secured with a retraction device that allows a length of cable to be stored. If the swimmer 20 submerges, the retraction device can allow cable to be paid out so that the floating transceiver 1002 remains afloat, providing a surface-visible marker of the location of the submerged swimmer 20. A swimmer 20 may also wear a PDID 10 as described above on the swimmer's 20 head, and the associated floating transceiver 1002 attached to the swimmer 20 may receive transmissions from the PDID 10, e.g. via Bluetooth, and relay or transmit those transmissions, and potentially additional information, to a hub 70 or other reception devices and components associated with system 1. The floating transceiver 1002 may make transmissions via any one or more technologies including but not limiting to GPS, Bluetooth, and Long Range (LoRa) radio technology, the latter providing extremely long range radio transmission.

In some embodiments, if the floating transceiver 1002 does not receive the radio signals from the swimmer's 20 wearable for a preset duration of time (e.g. 30 seconds or 45 seconds), the floating transceiver 1002 may transmit an alert and the swimmer's 20 real-time location coordinates via, e.g., LoRa (or other long-range radio or other effective transmission technology) to hubs 70 and/or other base stations positioned, e.g., on the shoreline, in support boats, or in a control center. Rescuers may then be alerted, via the floating transceiver 1002, that the swimmer 20 is in possible danger and also know that swimmer's 20 location, enabling a much faster rescue despite the victim being in a large body of water. In addition, the floating transceiver 1002 may also incorporate a "SOS" button or other element by which a swimmer 20 could opt to voluntarily generate an alert on demand if warranted, and thereby transmit a distress signal along with real-time location (e.g., GPS) coordinates to rescuers. In such embodiments, floating transceiver 1002 effectively mimics or duplicates some of the functionality of a hub 70, and may be thought of as a personal hub dedicated to a single swimmer 20. In some embodiments, floating transceiver 1002 may include various alerting devices, e.g. strobes, horns/sirens, visual markers, etc.

In some embodiments, a system 1 may also use auxiliary perimeter monitoring devices 1102, which may essentially comprise a modified hub 70. These devices 1102 may be used in and around an aquatic activity area, and may be configured to utilize a limited radio range such that only the radio transmissions of nearby wearables (e.g. within 5 feet, for example) are received. These devices 1102 may have on-board alert annunciators such as daylight viewable LED strobe lights, speakers or buzzers. In some embodiments, when the system 1 detects a potential drowning event, a hub 70 or server 80 may communicate wirelessly with all perimeter monitoring devices 1102 in the area (in addition to other hubs 70 monitoring swimming areas) instructing any perimeter monitoring device 1102 that may have recently received transmissions (e.g., during the previous five seconds) from the possible victim's PDID 10 to begin flashing its strobe light, sound an alarm tone, and/or provide spoken location coordinates (e.g., "section 5", "deep end") to assist rescuers in locating the victim as quickly as possible. Providing rescuers with the approximate location of the potential victim may be very useful for dark water environments such as lakes or ponds where visibility below the surface is typically very minimal. For aquatic centers with multiple pools in use, this feature would be very useful for indicating in which pool the victim is located.

Data Management

Currently, there is not a lot of data specific to drowning incidents, other than statistics gathered from either death or serious injury caused by drowning. In some examples, the system 1 may be able to successfully track swimmers and swimmer behavior before, during, and potentially after a drowning incident, and thereby enable a better understanding of risk factors for drowning and how drowning detection and prevention may be improved. As discussed above, various components of system 1 receive data, e.g. hubs 70 receive transmissions from various PDIDs 10, which may include data from various sensors, examples of which were enumerated above, that may be equipped to a PDID 10. Any monitored component or action of system 1 is a potential data point that may be analyzed to obtain useful information. Other examples of data points may include, e.g., number of alerts, time of alerts, type of alerts, locations of swimmers generating alerts, response time for alerts, false vs. real alarms, time swimmers spend underwater, location of responders at the time of each alert (provided that each responder 50 is equipped with a wearable 60 that provides location tracking services), etc. Hub 70 and/or a server 80 may further store this data for later retrieval and/or analysis. Storage may be accomplished locally on hub 70 and/or server 80, or alternatively or additionally on a remote cloud storage service. This data may be retrieved for subsequent analysis, either by system 1, e.g. server 80 may provide a dashboard of various metrics and allow drilling down into specific data sets, or for export to external systems for additional processing and analysis.

In a non-limiting example, researchers could utilize this data to gain a deeper insight into what happens physically before and during a drowning incident, and how that may be affected by age or previous swimming experience. In another non-limiting example, lifeguard training facilities may be able to utilize the same data to update training and rescue procedures if deemed necessary based on the findings, and provide a more inclusive proactive risk assessment for on-duty lifeguards. Additionally, the data may be used by each facility to monitor lifeguard behaviors and response times to improve them as necessary. In another example, a system 1 may be enabled to provide swimming management information to insurance companies, which could enable more accurate risk assessments by insurance providers, and lower insurance premiums for well-managed pools. In a final, non-limiting example, trainers working with competitive swimmers, or working with new swimmers in lessons, may be able to utilize the data to determine which swimmers may need more lessons, which strokes need more attention, how many laps were swam in one setting, or other profileable information from the swimmers wearing these devices.

In some embodiments, in order to be able to store and effectively format and/or analyze large amounts of data, the system 1 may be connected to a cloud platform as mentioned above and send data to the cloud platform on a regular basis (e.g., hourly, daily). This may help support keeping the local system 1 functioning at nominal performance without being burdened by high levels of local data storage, while still maintaining the captured information. Additionally, the tablet 100, server 80, and/or cloud platform, which may implement functionality of server 80, may apply artificial intelligence (A.I.) techniques to provide even more in-depth analyses and/or reports of swimmer, lifeguard, or submersion information, for example. Such data sets, potentially including all PDID 10 data, hub data, wearable 60 data, and monitor wearable data, potentially including data from multiple sensors on each PDID 10 such as location tracking, heart rate tracking, etc., and potentially including data such as video camera monitoring data connected with and overseen by the hub 70, may form a brand new, large and dense source of unique data on swimmer behavior, lifeguard performance, drowning risk factors, and drowning detection and prevention, and may thus form a uniquely valuable set of machine learning training data for novel machine learning applications, such as A.I.-powered drowning prediction and prevention. By collecting and utilizing data that has never been collected before, substantial strides could thus be made regarding overall water safety, and provide new opportunities for researchers, lifeguards, aquatic facilities, and swimmers alike.

For example, using the unique MAC addresses, the sensor hub 70 may collect signals from the differentiated groups of PDIDs 10 so that the data reflects not only how many swimmers are active and when, but also how many swimmers of differentiated skill levels are in a pool at any one time, e.g., beginners, intermediate, and advanced swimmers. Additionally, the alerts from each group of PDIDs 10 may be formatted differently so that a lifeguard is immediately knowledgeable on if they are looking for an adult or a child, or for an experienced swimmer or a beginning swimmer, in the event of a drowning incident.

This is not only helpful in real-time, as lifeguards may receive the information on the ratio of adults to children in the pool, but also when analyzing any data tracked by system 1 at a later time. For example, patterns and trends of when more children or beginners are active, compared to when an aquatic facility may not be as busy, may become apparent as more and more data is collected, allowing for more proactive pool management. Additionally, if this technology is being used as part of competitive water sports during training, this submersion data, in combination with data from any of the other potential embedded sensors in a PDID 10, may also be helpful in determining swimming patterns, proper orientation of the swimmer's head in the water, and locating areas where the swimmer may need improvement, as their heads are consistently recorded coming in and out of the water.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A device comprising:
a device body comprising a band with first and second end portions connected by a curved bridge portion, wherein the device body is configured to securely grip a human head with the first and second end portions positioned on or above respective temples of the head;
wherein the device body has a lower net density or lower specific gravity than water such that the device is configured to float in water;
a first signal generator disposed within the first end portion;
a second signal generator disposed within the second end portion;
a processing unit disposed within the device body in communication with the first and second signal generators;
an accelerometer, operably coupled to a controller;
wherein the processing unit is configured to:
receive outputs from the accelerometer;
determine that the outputs from the accelerometer are consistent with the device body floating on a water surface; and
transmit, via at least one of the first and second signal generators, an indication that the device is floating.

2. The device of claim 1, wherein the processing unit is configured to cause the first and second signal generators to transmit signals continuously.

3. The device of claim 1, wherein the processing unit is configured to cause the first and second signal generators to transmit signals periodically, with a period between transmissions of between zero and 30 seconds.

4. The device of claim 1, wherein the processing unit is configured to output an activation signal to the first and second signal generators in response to detection of an activation state,
wherein the first and second signal generators are configured to transmit signals in response to the activation signal.

5. The device of claim 4, further comprising: wherein the accelerometer is operably coupled to the processing unit, wherein the processing unit is configured to output the activation signal to the first and second signal generators in response to detecting a signal from the accelerometer.

6. The device of claim 1, wherein the processing unit is configured to signal the first and second signal generators to cease signal transmission in response to a deactivation state.

7. The device of claim 6, further comprising:
wherein the accelerometer is operably coupled to the processing unit,
wherein the processing unit is configured to:
measure a period of time without receiving a signal from the accelerometer; and
cause the first and second signal generators to cease signals transmission in response to detection of a passage of a predetermined period of time without receipt of a signal from the accelerometer.

8. The device of claim 1, further comprising:
a first cushioning element disposed on an interior side of the first end portion; and a second cushioning element disposed on an interior side of the second end portion.

9. The device of claim 1, wherein the device body is flexibly mechanically deformable in a radial direction within a plane in which the device body extends, with a selected radial spring constant such that the device body is configured to be positioned on and to grip the human head with the first and second end portions adjacent the respective temples of the human head,thereby keeping the device positioned both securely and comfortably on the human head.

10. The device of claim 1, further comprising a power source disposed within the device body in operative coupling with the first and second signal generators and the processing unit.

11. The device of claim 1, further comprising one or more additional components selected from among: a perimeter monitor, a submersion tracker, a flex sensor, a gyroscope, a heart rate monitor, and a GPS tracker, disposed within the device body, wherein the processing unit is configured to transmit data from the one or more additional components via at least one of the first and second signal generators.

12. The device of claim 1, further comprising one or more components configured to detect an indication of an anomalous health condition, wherein the processing unit is configured to transmit, via at least one of the first and second signal generators, an alert signal, in response to detection of the indication of the anomalous health condition.

13. The device of claim 1, further comprising a component to detect whether the device is being worn on the human head,
wherein the processing unit is configured to transmit, via at least one of the first and second signal generators, at least one of: an indication that the device has been put on; an indication that the device is being worn; and an indication that the device has been removed.

14. The device of claim 1, further comprising a location tracking component,wherein the processing unit is configured to:
detect, via the location tracking component, if the device moves outside of a selected area; and
output at least one of a user alert or an alert signal, in response to detection that the device has moved outside of the selected area.

* * * * *